United States Patent
Kando

(10) Patent No.: US 9,295,909 B2
(45) Date of Patent: Mar. 29, 2016

(54) NON-TRANSITORY STORAGE MEDIUM ENCODED WITH INFORMATION PROCESSING PROGRAM CAPABLE OF PERFORMING NATURAL MOVEMENT CONTROL OF CHARACTER MOVING IN ACCORDANCE WITH ANOTHER CHARACTER, INFORMATION PROCESSING APPARATUS, METHOD OF CONTROLLING INFORMATION PROCESSING APPARATUS, AND INFORMATION PROCESSING SYSTEM

(71) Applicant: NINTENDO CO., LTD., Kyoto (JP)

(72) Inventor: Yuji Kando, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 193 days.

(21) Appl. No.: 14/027,737

(22) Filed: Sep. 16, 2013

(65) Prior Publication Data

US 2014/0357359 A1 Dec. 4, 2014

(30) Foreign Application Priority Data

Jun. 4, 2013 (JP) .................................. 2013-117938

(51) Int. Cl.
*A63F 13/00* (2014.01)
(52) U.S. Cl.
CPC ...................................... *A63F 13/00* (2013.01)
(58) Field of Classification Search
None
See application file for complete search history.

(56) References Cited

U.S. PATENT DOCUMENTS

| | | | | |
|---|---|---|---|---|
| 6,729,954 B2 * | 5/2004 | Atsumi et al. | ...................... | 463/7 |
| 6,760,050 B1 * | 7/2004 | Nakagawa | .............. | H04S 1/002 463/33 |
| 7,424,388 B2 * | 9/2008 | Sato | ........................ | A63F 13/06 345/156 |
| 7,677,977 B2 * | 3/2010 | Maehiro et al. | .................. | 463/32 |
| 7,785,198 B2 * | 8/2010 | Kando | .............................. | 463/30 |
| 7,963,833 B2 * | 6/2011 | Novak | ..................... | A63F 13/12 463/2 |
| 8,308,563 B2 * | 11/2012 | Ikeda | ....................... | A63F 13/06 463/36 |
| 2005/0221880 A1 * | 10/2005 | Kando | .............................. | 463/9 |
| 2007/0218992 A1 * | 9/2007 | Maehiro et al. | .................. | 463/31 |
| 2007/0262999 A1 * | 11/2007 | Bridger | ..................... | A63F 13/10 345/473 |
| 2010/0029384 A1 * | 2/2010 | Andersen | ................. | A63F 13/10 463/32 |
| 2011/0111851 A1 * | 5/2011 | Hayashida | ............... | A63F 13/10 463/36 |
| 2013/0079140 A1 * | 3/2013 | Watkins, Jr. | ............. | A63F 13/06 463/37 |
| 2014/0342808 A1 * | 11/2014 | Chowdhary | ........... | A63F 13/493 463/24 |
| 2015/0190719 A1 * | 7/2015 | Chowdhary | ............. | A63F 13/67 463/31 |

FOREIGN PATENT DOCUMENTS

JP 2005-287757 10/2005

* cited by examiner

*Primary Examiner* — Masud Ahmed
(74) *Attorney, Agent, or Firm* — Nixon & Vanderhye P.C.

(57) ABSTRACT

An exemplary embodiment provides a non-transitory storage medium encoded with a computer-readable information processing program for performing information processing in which a first object moves and at least one second object moves in accordance with the movement of the first object in virtual space. The information processing program is configured to cause the computer to function as an input acceptance unit for accepting an input, a first object movement control unit for performing movement control of the first object in the virtual space based on the input, a range calculation unit for calculating a movable range where the second object can move in the virtual space, based on a position of the first object moved by the first object movement control unit, and a second object movement control unit for performing movement control of the second object based on the movable range calculated by the range calculation unit.

21 Claims, 20 Drawing Sheets

NON-TRANSITORY STORAGE MEDIUM ENCODED WITH INFORMATION PROCESSING PROGRAM CAPABLE OF PERFORMING NATURAL MOVEMENT CONTROL OF CHARACTER MOVING IN ACCORDANCE WITH ANOTHER CHARACTER, INFORMATION PROCESSING APPARATUS, METHOD OF CONTROLLING INFORMATION PROCESSING APPARATUS, AND INFORMATION PROCESSING SYSTEM

This nonprovisional application is based on Japanese Patent Application No. 2013-117938 filed on Jun. 4, 2013, with the Japan Patent Office, the entire contents of which are hereby incorporated by reference.

FIELD

The present disclosure relates to a non-transitory storage medium encoded with a computer-readable information processing program, an information processing apparatus, a method of controlling the information processing apparatus, and an information processing system. More particularly, the present disclosure relates to performing information processing in which a first object moves and at least one second object moves in accordance with the movement of the first object in virtual space.

BACKGROUND AND SUMMARY

Conventionally, there have been proposed apparatuses and the like performing information processing in which a sub-character follows a leader character, or a plurality of characters move in a group.

In this respect, there have been proposed various methods of avoiding an obstacle such as a terrain when the characters are blocked by the obstacle and cannot move.

The present application was made to solve the problem as described above, and an object of the present application is to provide a non-transitory storage medium encoded with a computer-readable information processing program capable of further increasing interest of data communication, an information processing apparatus, a method of controlling the information processing apparatus, and an information processing system.

An exemplary embodiment provides a non-transitory storage medium encoded with a computer-readable information processing program for performing information processing in which a first object moves and at least one second object moves in accordance with the movement of the first object in virtual space, the information processing program being executable by a computer of an information processing apparatus, the information processing program being configured to cause the computer to function as an input acceptance unit for accepting an input, a first object movement control unit for performing movement control of the first object in the virtual space based on the input to the input acceptance unit, a range calculation unit for calculating a movable range where the second object can move in the virtual space, based on a position of the first object moved by the first object movement control unit, and a second object movement control unit for performing movement control of the second object based on the movable range calculated by the range calculation unit.

In the exemplary embodiment, the range calculation unit may repeatedly calculate the movable range.

In the exemplary embodiment, the range calculation unit may calculate a region formed based on the repeatedly calculated movable ranges as a new movable range.

In the exemplary embodiment, the second object movement control unit may perform movement control of the second object, by setting the newly calculated movable range as a movement target.

In the exemplary embodiment, the second object movement control unit may perform movement control of the second object, by setting a subsequent movable range in chronological order among the newly calculated movable ranges as a movement target.

In the exemplary embodiment, the second object movement control unit may perform movement control of the second object, by setting a movable range closer than a subsequent movable range in chronological order among the newly calculated movable ranges as a movement target.

In the exemplary embodiment, the second object movement control unit may perform movement control of the second object, by setting the movement target on a position on the subsequent movable range based on a position on the movable range passed lastly by the second object.

In the exemplary embodiment, the second object movement control unit may perform movement control of the second object, by setting the movement target on the position on the subsequent movable range based on the position on the movable range passed lastly by the second object with reference to a predetermined position, and the predetermined position on the subsequent movable range.

In the exemplary embodiment, the movable range may be a range based on a direction of movement of the first object.

In the exemplary embodiment, the second object movement control unit may perform movement control of the second object, by setting the movable range as a movement target.

In the exemplary embodiment, the second object movement control unit may perform movement control of the second object, by setting movement target coordinates based on a position of the first object.

In the exemplary embodiment, the movable range may be a range including a position of the first object.

In the exemplary embodiment, the second object movement control unit may perform movement control of the second object within a safe region formed based on a plurality of the movable ranges calculated by the range calculation unit.

In the exemplary embodiment, the movable range may be variable in size based on a range where the second object can move in the virtual space.

In the exemplary embodiment, the non-transitory storage medium may further include region information for defining a region where the second object can move and a region where the second object cannot move in the virtual space, and the range calculation unit may calculate the movable range of the second object by referring to the region information.

In the exemplary embodiment, the region information may be defined in accordance with a position and a height in the virtual space, and the range calculation unit may calculate the movable range of the second object based on a position and a height of the first object in the virtual space by referring to the region information.

In the exemplary embodiment, an attribute of a region may be set in the virtual space, and the second object movement control unit may perform movement control of the second object based on the attribute of the region.

In the exemplary embodiment, the second object may be provided with a movement attribute about a manner in which the second object moves, and the range calculation unit may calculate the movable range based on the position of the first object moved by the first object movement control unit and the movement attribute.

An exemplary embodiment provides a method of controlling an information processing apparatus performing information processing in which a first object moves and at least one second object moves in accordance with the movement of the first object in virtual space, the method including the steps of accepting an input, performing movement control of the first object in the virtual space based on the input, calculating a movable range where the second object can move in the virtual space based on a position of the moved first object, and performing movement control of the second object based on the calculated movable range.

An exemplary embodiment provides an information processing apparatus performing information processing in which a first object moves and at least one second object moves in accordance with the movement of the first object in virtual space, the information processing apparatus including an input acceptance unit for accepting an input, a first object movement control module for performing movement control of the first object in the virtual space based on the input to the input acceptance unit, a range calculation module for calculating a movable range where the second object can move in the virtual space based on a position of the first object moved by the first object movement control module, and a second object movement control module for performing movement control of the second object based on the movable range calculated by the range calculation module.

An exemplary embodiment provides an information processing system including an information processing apparatus performing information processing in which a first object moves and at least one second object moves in accordance with the movement of the first object in virtual space, the information processing system including an input acceptance unit for accepting an input, a first object movement control module for performing movement control of the first object in the virtual space based on the input to the input acceptance unit, a range calculation module for calculating a movable range where the second object can move in the virtual space based on a position of the first object moved by the first object movement control module, and a second object movement control module for performing movement control of the second object based on the movable range calculated by the range calculation module.

According to the exemplary embodiments, interest of data communication can be increased.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
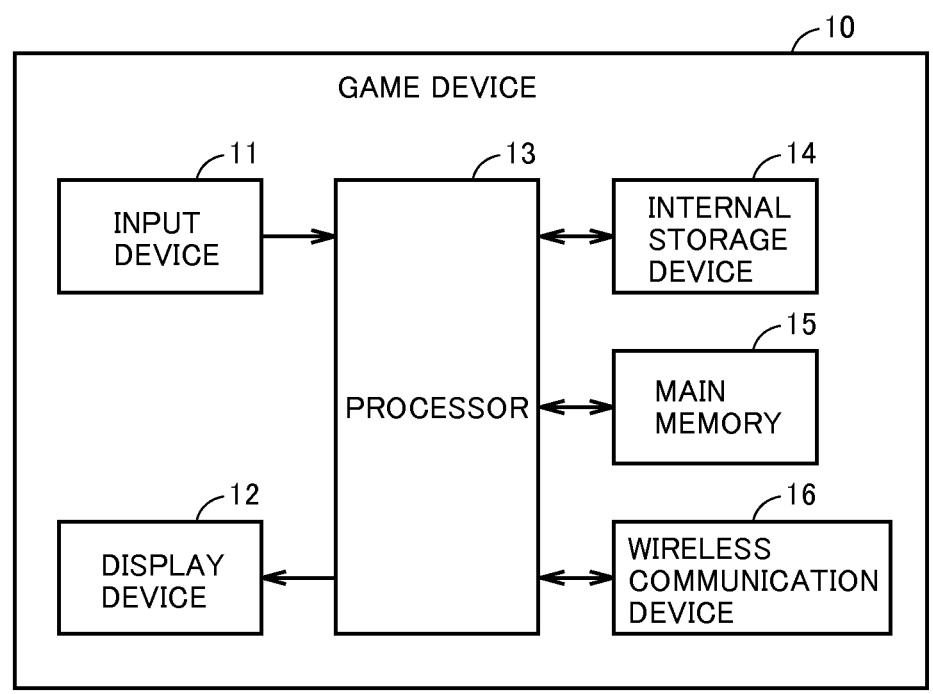
FIG. 1 shows an exemplary illustrative non-limiting schematic block diagram of the configuration of a game device 10 according to a first exemplary embodiment.

Some embodiments will be described in detail with reference to the drawings. The same or corresponding elements in the drawings have the same reference characters allotted and description thereof will not be repeated.

First Embodiment

Configuration of Information Processing Apparatus

This example describes a game device as an example of an information processing apparatus.

FIG. 1 is a schematic block diagram of the configuration of a game device 10 according to a first embodiment. It is noted that this game device may be of a portable type or of a stationary type.

Referring to FIG. 1, game device 10 includes an input device 11, a display device 12, a processor 13, an internal storage device 14, a main memory 15, and a wireless communication device 16. It is noted that all elements are not required elements, and wireless communication device 16 may be removed from the configuration, for example.

Input device 11 is operated by a user of game device 10, and outputs a signal in accordance with the user's operation to processor 13. Input device 11 is, for example, a cross-shaped switch, a push button or a touch panel.

Display device 12 displays an image generated in game device 10 on a screen. As an example, a liquid crystal display (LCD) device can be employed as display device 12.

Processor 13 is an operation processing unit for executing a computer program.

Internal storage device 14 stores the computer program executed by processor 13. As an example, a NAND type flash memory can be employed as internal storage device 14. It is noted that the computer program executed by processor 13 may be prerecorded, or may be obtained from another device through communication with the another device.

Main memory 15 temporarily stores a computer program and information. As an example, a PSRAM (Pseudo-SRAM) can be employed as main memory 15.

Wireless communication device 16 transmits a signal to another game device or receives a signal from another game device via wireless communication.

[Overview of Movement Control in Game Processing]

Next, a specific example of game processing performed by processor 13 based on a game program, which is a type of the computer program (information processing program) stored in internal storage device 14, is described.

In a game performed in this embodiment, a player plays by moving characters in virtual space (also referred to as game space) using input device 11. It is noted that in the game space, in addition to a character operated by the player (hereinafter also referred to as a leader character), at least one character subjected to movement control by processor 13 based on a predetermined algorithm (hereinafter also referred to as a sub-character) exists. The plurality of sub-characters are subjected to movement control in such a manner that the sub-characters move (follow) in a column or in a group in accordance with movement of the leader character.

Figure 2:
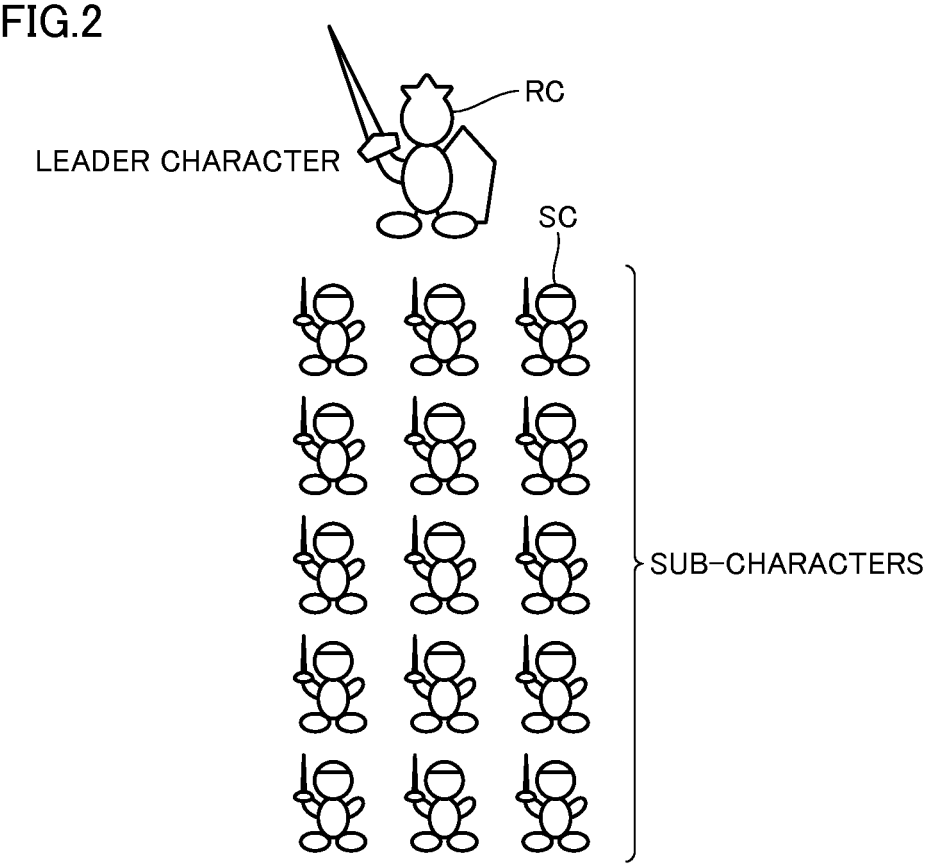
FIG. 2 shows an exemplary illustrative non-limiting diagram illustrating how characters move according to the first exemplary embodiment.

FIG. 2 illustrates how the characters move according to the first embodiment. Referring to FIG. 2, a case is shown where a leader character RC and a plurality of sub-characters SC following leader character RC move in columns. In this example, fifteen sub-characters SC are provided for one leader character RC. It is noted that a plurality of sub-characters SC need not be provided for leader character RC, and the game may be configured such that at least one sub-character SC follows leader character RC.

In the case shown, the plurality of sub-characters SC follow leader character RC in an orderly manner on a side (back side) opposite a traveling direction of leader character RC. In reality, however, the sub-characters do not move in orderly columns but are independently subjected to movement control, resulting in columns with a certain degree of freedom depending on the difference in movement speed between the sub-characters, the effects of terrain and so on. It is noted that the sub-characters may be subjected to movement control in such a manner that they form the orderly columns such as shown in FIG. 2 upon passage of a sufficient period of time after the leader character stops moving.

FIGS. 3(A) and 3(B) illustrate movement ranges of the characters according to the first embodiment. Referring to FIG. 3(A), the leader character moves in the game space in accordance with an input to input device 11. Here, positions passed by the leader character in the game space in accordance with the movement control of the leader character are shown. This example describes the positions passed by the leader character as footprints Sn to Sn−4 (hereinafter also collectively referred to as a footprint S) as an example. In chronological order, a k-th footprint prior to the latest footprint Sn is indicated as a footprint Sn−k. This example shows footprints until k=4.

Then, based on footprint S of the leader character, a range where the sub-character can move (movable range) is searched for (calculated) in the game space in advance. In this example, movable ranges SPn to SPn−4 (hereinafter also collectively referred to as a movable range SP) have been searched for based on the respective positions S (Sn to Sn−4) of the leader character. In chronological order, a movable range that has been searched for based on the latest footprint Sn is indicated as movable range SPn. A movable range that has been searched for based on footprint Sn−k is indicated as a movable range SPn−k. This example shows ranges until k=4.

The range where the sub-character can move means a movable range except for a range where the sub-character cannot move due to an obstacle and the like arranged in the game space.

The sub-character in the first embodiment is subjected to movement control utilizing the movable range that has been searched for. Specifically, the sub-character is subjected to movement control in which the movable range that has been searched for is set as a movement target. In other words, the movement control is implemented by controlling the movement of the sub-character within a safe region SF generated based on the plurality of movable ranges SP that have been searched for. Safety region SF is generated by connecting the plurality of movable ranges SP together. For a portion where movable range SP has not been searched for (calculated) between movable ranges SP, safe region SF can be generated by performing an interpolation process in accordance with the prior and subsequent movable ranges.

Referring to FIG. 3(B), when the leader character and each sub-character are moving in the game space, there may be provided an obstacle such as a wall, a cliff from which the characters may fall, and the like in the game space.

In a manner similar to above, based on footprint S of the leader character, a range where the sub-character can move (movable range) is searched for (calculated) in the game space in advance. In this case, the movable range is reduced because of the obstacle such as a wall, the cliff from which the characters may fall, and the like.

Then, based on the result of the search, movement control is performed utilizing the movable range that has been searched for. Specifically, the sub-character is subjected to movement control within safe region SF generated based on the plurality of movable ranges SP.

Safe region SF is a region where the sub-character can move which is generated based on the movable ranges that have been searched for. By setting a movement target location within safe region SF and performing the movement control of the sub-character, the sub-character can be moved safely without colliding with the obstacle such as a wall or falling from the cliff.

Moreover, since the sub-character is subjected to the movement control within safe region SF generated based on the movable ranges that have been searched for in advance, there is no possibility of the sub-character being blocked by the obstacle and unable to move. Namely, the obstacle can be avoided before the obstacle blocks the sub-character, thereby implementing movement control more natural than movement control in which the obstacle is avoided after the obstacle blocks the sub-character.

In addition, the movable range in the first embodiment is set by a search around the position of the leader character with reference to the position of the leader character, and is not set for each sub-character. Therefore, a load of calculating the movable range does not vary to increase a processing load of the movement control even if the number of sub-characters is increased, thereby performing movement control of the sub-character with a light processing load.

As described above, each sub-character moves toward a target location within safe region SF. Specifically, by successively setting the movable ranges accumulated in chronological order as targets and moving the sub-characters, the sub-characters move in the game space in a column or in a group to follow the leader character as shown in FIG. 2.

In this embodiment, a current position (coordinates in a space coordinate system) of the leader character is successively accumulated at predetermined timing as "movable range data" of the leader character. More specifically, the movable range data is stored once every predetermined number of frames, for example (e.g., once every ten frames). The data thus stored includes a frame number and the coordinates (footprint reference coordinates) of the leader character at that point in time. The movable range data also stores a region range where the leader character can move, which is calculated based on the footprint reference coordinates.

It is noted that in this embodiment, if the leader character is not away from a movable range by a certain distance or more upon passage of ten frames since the movable range data was stored the last time, new movable range data is not stored. Thus, when the leader character has hardly moved, namely, when the leader character has moved only slightly from the last position, similar movable range data is not accumulated. As a result, utilizable movable range data can be effectively accumulated to effectively use a storage area. Since the movable range data cannot be accumulated infinitely, the movable range data which has been stored for longer than a certain period of time needs to be deleted from the storage area. If the number of pieces of accumulated movable range data reaches a certain number, for example, when new movable range data is stored, the oldest movable range data (i.e., movable range data with the smallest frame number) among the accumulated movable range data may be deleted from the storage area.

Figure 4:
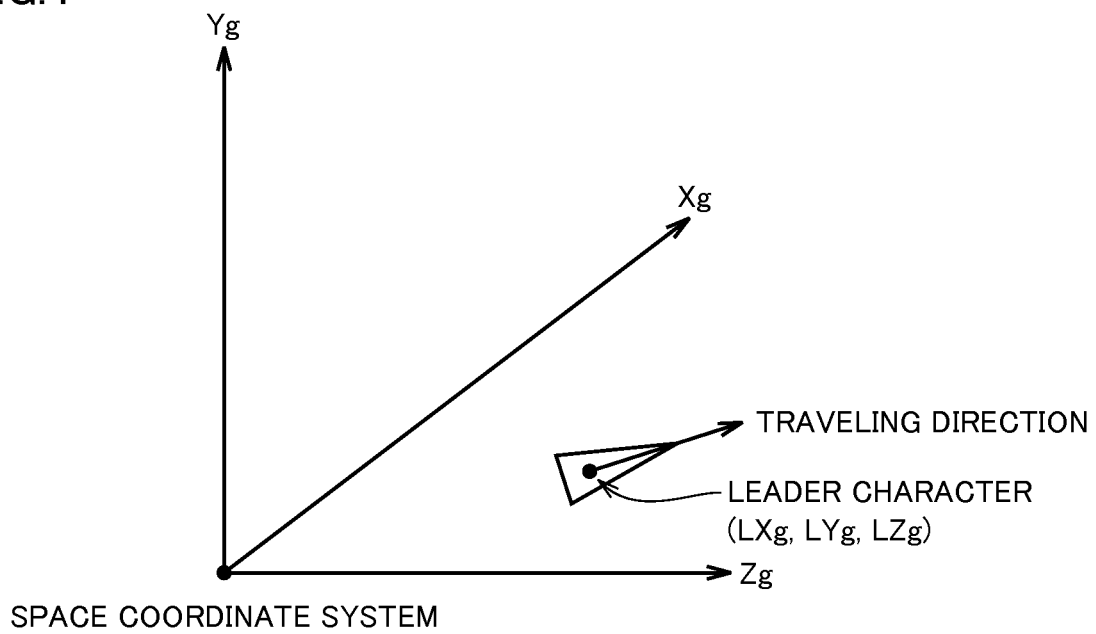
FIG. 4 shows an exemplary illustrative non-limiting diagram illustrating a space coordinate system according to the first exemplary embodiment.

FIG. 4 illustrates the space coordinate system according to the first embodiment.

Referring to FIG. 4, a space coordinate system Xg, Yg, Zg is defined, and the coordinates of the leader character are set (LXg, LYg, LZg) with reference to the space coordinate system. A traveling direction of the leader character is also defined. The leader character is provided in such a manner that it can move in this direction or in a changed direction in the game space.

Furthermore, with reference to the space coordinate system, field information (region information) including a region where the character can move and a region where the character cannot move in the virtual space is defined in a game progressing process.

By determining whether or not the leader character can move in the region such as a wall or a cliff constituting this field information with reference to the coordinates of the leader character, the movable range is calculated.

Next, the game processing performed by processor 13 based on the game program will be described in more detail.

[Configuration of Memory Map]

Figure 5:
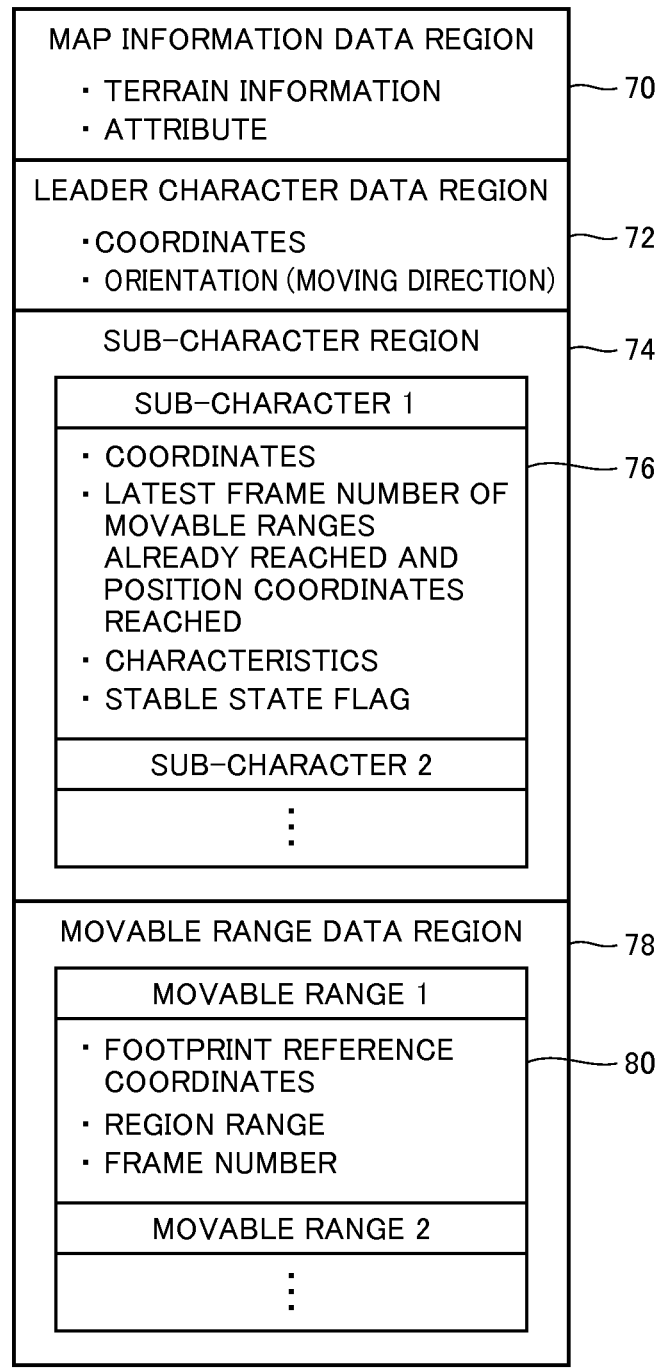
FIG. 5 shows an exemplary illustrative non-limiting diagram illustrating a memory map of a main memory 15 according to the first exemplary embodiment.

FIG. 5 illustrates a memory map of main memory 15.

Referring to FIG. 5, main memory 15 includes a map information data region 70, a leader character data region 72, a sub-character data region 74, and a movable range data region 78.

Map information data region 70 stores the field information for defining a movable region and an unmovable region in the game space. For example, the field information generally includes terrain information necessary for rendering as a terrain object in the game space. The terrain object is arranged in the game space based on coordinates based on a space coordinate system set in the terrain information. Moreover, the terrain object is set as associated with attribute information such as a wall, a cliff, or water.

Leader character data region 72 stores coordinates of a current position based on the space coordinate system of the leader character, and an orientation based on the space coordinate system of the leader character.

Sub-character data region 74 includes sub-character data 76 for each sub-character. Each sub-character data 76 includes coordinates of a current position based on a space coordinate system of the sub-character, a frame number of the latest movable range of the movable ranges already reached in the movable range data and position coordinates reached within that movable range, characteristics of the sub-character, and a stable state flag.

The characteristics of the sub-character as used herein refer to characteristics of movement of the sub-character to be described later. In this example, as will be described later, a plurality of types of characteristics are provided in advance as the movement characteristics of the sub-character. As the types of the movement characteristics of the sub-character, for example, a case where the sub-character moves on the ground by foot and a case where the sub-character moves in the air are provided. Furthermore, a case where the sub-character can move through the water and a case where the sub-character cannot move through the water are provided in advance. As will be described later, the movement control can be changed based on the movement characteristics of the sub-character. This example describes a case where the sub-character moves on foot as an example.

The stable state flag of a sub-character as used herein refers to a flag indicating whether or not there is a stable state that is used to determine whether or not to perform the movement control of the sub-character, as will be described later. In this example, ON/OFF of the stable state flag of each sub-character is determined to perform movement control accordingly. Specifically, when the stable state flag is ON, the movement control is not performed. When the stable state flag is OFF, on the other hand, the movement control is performed. As will be described later, the stable state flag is turned ON when a movable range serving as a final target is reached in the movement control of a sub-character. When a sub-character collides with a sub-character whose stable state flag is ON, the stable state flag of this colliding sub-character is also turned ON. Therefore, when the stable state flag of a head sub-character close to the leader character is turned ON (e.g., when a movable range serving as a final target is reached), the stable state flags of the following sub-characters are turned ON when they collide with the sub-character whose stable state flag is ON, for example. If an additional plurality of sub-characters are provided, this situation is repeated to turn the stable state flags of the following sub-characters ON. With this process, the respective stable state flags of the plurality of sub-characters are turned ON to form a single group or a swarm, and the movement control is completed (movement is stopped) in this state.

The frame number of the movable range data is used to ascertain which movable range the sub-character has reached.

Movable range data region 78 includes a plurality of pieces of movable range data 80. Each movable range data includes footprint reference coordinates, a region range, and a frame number.

The footprint reference coordinates refer to coordinates of footprint S of the leader character. The region range refers to data about a range where a sub-character can move, which is calculated by a movable range calculation process to be described later.

The frame number refers to a number generated at regular intervals in synchronization with a time from the start of a game. Regarding movable range data 80, in accordance with a frame number included in the data, data about a corresponding movable range can be obtained.

[Main Flow]

Figure 6:
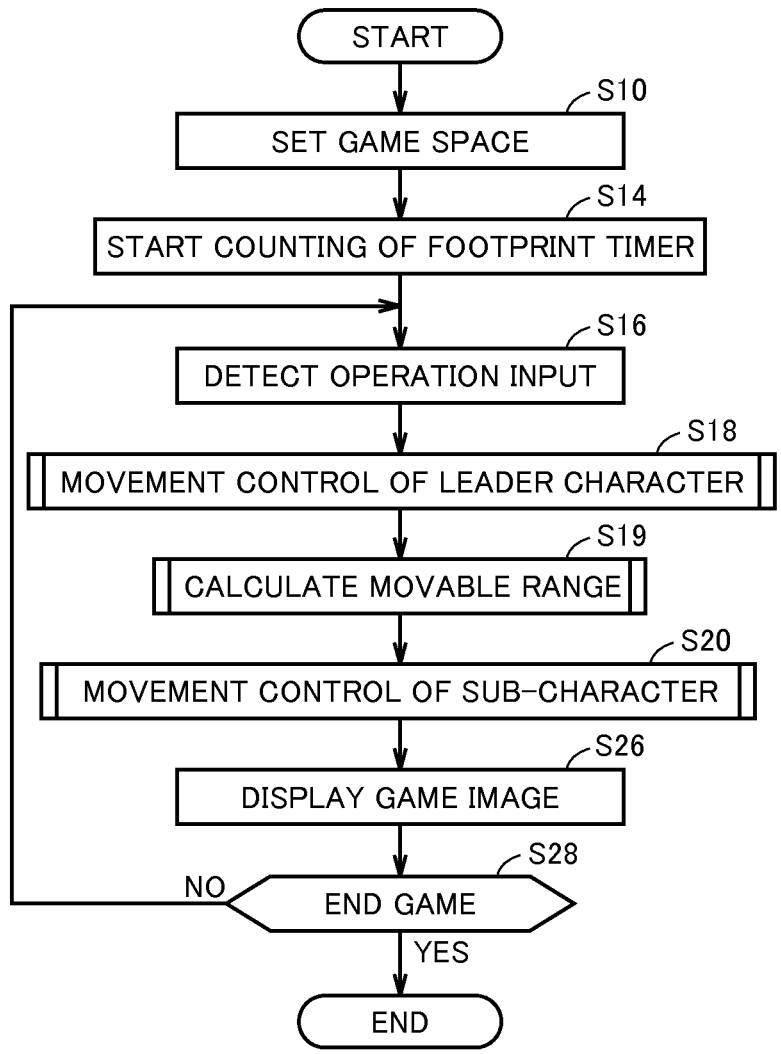
FIG. 6 shows an exemplary illustrative non-limiting flowchart illustrating a main flow of game processing performed by a processor 13 based on a game program according to the first exemplary embodiment.

FIG. 6 is a flowchart illustrating a main flow of the game processing performed by processor 13 based on the game program according to the first embodiment.

Referring to FIG. 6, processor 13 first sets game space (step S10). More specifically, various objects (terrain objects) for defining a region where the leader character and the like can move and a region where they cannot move are arranged based on the field information stored in map information data region 70. As an example, a wall, a cliff and the like are arranged in the game space. In addition, the leader character and sub-characters are arranged in their initial positions in the game space.

Next, processor 13 starts counting of a footprint timer (step S14). The footprint timer is a timer for storing the movable range data once every ten frames.

Next, processor 13 detects an operation input from input device 11 (step S16).

Next, processor 13 performs a movement control process of controlling the movement of the leader character in the virtual space based on the operation input from input device 11 (step S18). This movement control process of the leader character will be described later.

Next, processor 13 calculates a movable range where the sub-characters can move in the virtual space with reference to the position of the leader character in accordance with the movement control process of the leader character (step S19). The calculation of this movable range will be described later.

Next, processor 13 performs a movement control process of controlling the movement of the sub-characters within a safe region formed based on the calculated movable ranges (step S20). The movement control process of the sub-characters will be described later.

Next, processor 13 causes display device 12 to display a game image (step S26).

Next, processor 13 determines whether or not the game has ended (step S28).

If it is determined that the game has ended (YES in step S28), processor 13 ends the process (END).

If it is determined that the game has not ended (NO in step S28), on the other hand, processor 13 returns to step S16 and repeats the process described above.

Figure 7:
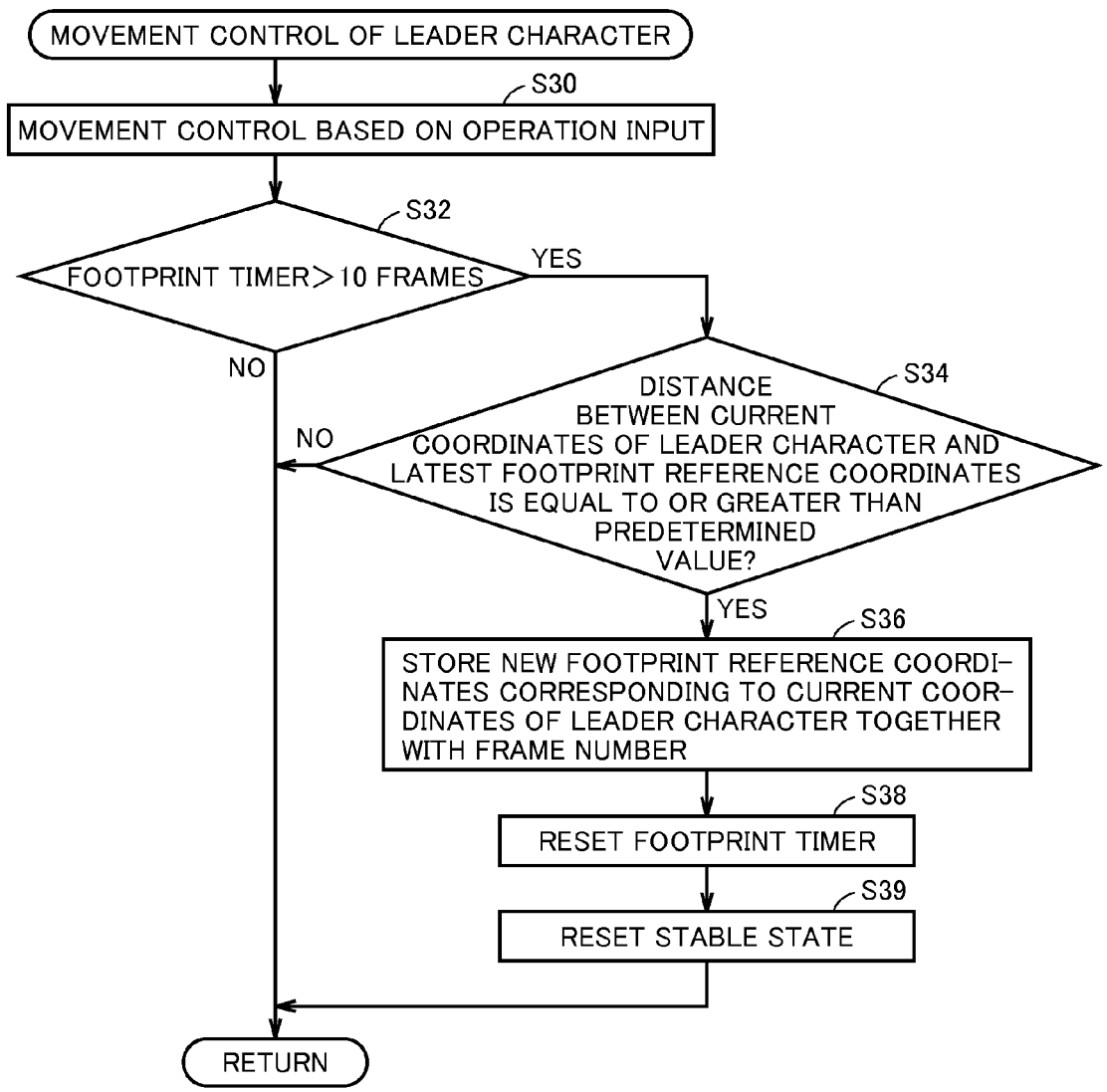
FIG. 7 shows an exemplary illustrative non-limiting flowchart illustrating the details of a movement control process on a leader character according to the first exemplary embodiment.

FIG. 7 is a flowchart illustrating the details of the movement control process of the leader character according to the first embodiment.

Referring to FIG. 7, processor 13 first performs movement control of the leader character based on the operation input (step S30). More specifically, processor 13 updates coordinates and a traveling direction of the leader character based on the operation input. Next, processor 13 determines whether or not a count value of the footprint timer has exceeded a predetermined number of frames (e.g., ten frames) (step S32).

If it is determined in step S32 that the count value of the footprint timer has exceeded ten frames (YES in step S32), processor 13 determines whether or not a distance between current coordinates of the leader character and footprint reference coordinates of the latest movable range data is equal to or greater than a predetermined value (step S34). It is noted that the footprint reference coordinates of the latest movable range data are obtained from movable range data having the largest frame number among the plurality of pieces of movable range data included in movable range data region 78 in main memory 15.

If it is determined in step S32 that the count value of the footprint timer has not exceeded ten frames (NO in step S32), or if it is determined in step S34 that the distance between the current coordinates of the leader character and the footprint reference coordinates of the latest movable range data is not equal to or greater than the predetermined value, namely, is less than the predetermined value (NO in step S34), processor 13 ends the movement control process of the leader character without performing a process for setting new movable range data.

If it is determined in step S34 that the distance between the current coordinates of the leader character and the footprint reference coordinates of the latest movable range data is equal to or greater than the predetermined value (YES in step S34), on the other hand, processor 13 stores the current coordinates of the leader character as new footprint reference coordinates, together with a frame number, for setting new movable range data (step S36). They can be registered, for example, in an area provided for storing new movable range data. It is noted that a region range is calculated in the movable range calculation process to be described later based on the new footprint reference coordinates.

Next, processor 13 resets the footprint timer (starts recounting) (step S38).

Next, processor 13 resets the stable state flag (step S39). The resetting of the stable state flag in the first embodiment means setting all sub-characters to an initial OFF state. Namely, the stable state flag of each sub-character is turned OFF. As a result, movement control is performed on each sub-character to follow the leader character.

Then, the movement control process of the leader character ends (RETURN).

When the movement control process of the leader character ends in FIG. 6, processor 13 performs a movable range calculation process of calculating a range where the leader character can move (step S19).

The details of the movable range calculation process will be described.

Figure 8:
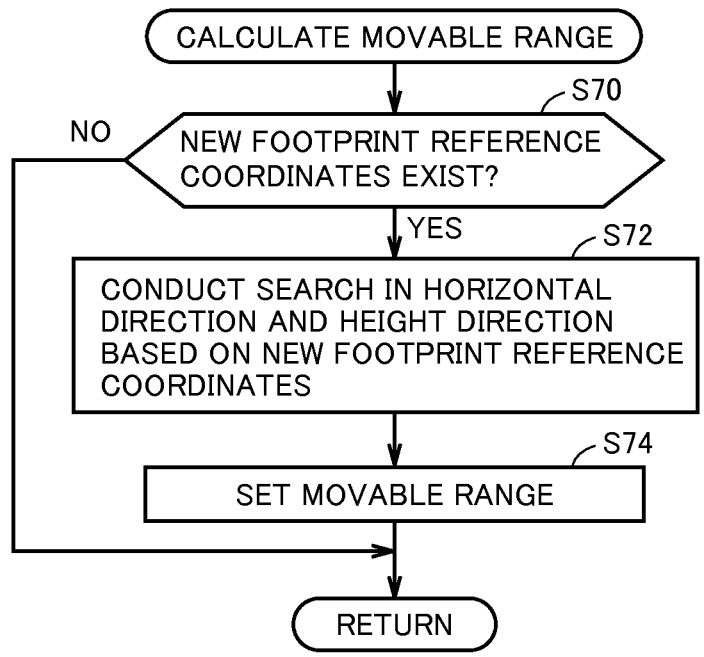
FIG. 8 shows an exemplary illustrative non-limiting flowchart illustrating the details of a movable range calculation process according to the first exemplary embodiment.

FIG. 8 is a flowchart illustrating the details of the movable range calculation process according to the first embodiment.

Referring to FIG. 8, first, processor 13 determines whether or not new footprint reference coordinates exist (step S70). Specifically, the determination can be made based on whether or not new footprint reference coordinates have been stored together with a frame number by the movement control process of the leader character described above.

If it is determined that new footprint reference coordinates exist (YES in step S70), processor 13 searches for a movable range in a horizontal direction and a height direction based on the new footprint reference coordinates (step S72).

Next, processor 13 sets a movable range based on the result of the search in the horizontal direction and the height direction (step S74). Specifically, the movable region range that has been searched for as described above is associated with footprint reference coordinates and a frame number, and is registered as the latest movable range data, in the area for storing new movable range data.

Then, the process ends (RETURN).

If it is determined that new footprint reference coordinates do not exist (NO in step S70), on the other hand, processor 13 ends the process (RETURN). This is because, in this case, if the leader character remains still without moving, for example, there is no need to repeatedly calculate the movable range.

As an example, if a maximum of ten pieces of movable range data can be stored in movable range data region 78, and when ten pieces of movable range data have already been stored in movable range data region 78, new movable range data is written over an area storing movable range data having the smallest frame number.

FIGS. 9(A) to 9(C) illustrate the concept of searching for a movable range according to the first embodiment.

Referring to FIG. 9(A), a method of the movable range calculation process according to the first embodiment will be described. In this example, a movable range of the leader character based on a traveling direction (moving direction) is calculated as a movable range of the sub-character. Specifically, with reference to footprint reference coordinates in accordance with the position of the leader character, the movable range of the leader character is calculated in a horizontal direction (lateral direction) perpendicular to the traveling direction (moving direction) of the leader character and a height direction (longitudinal direction) as the movable range of the sub-character. More specifically, it is determined whether or not the leader character comes in contact with an object (e.g., a wall) that may serve as an obstacle within a range of a predetermined distance in the horizontal direction with reference to the footprint reference coordinates. It is noted that a movable range may be searched for by determining whether or not the leader character comes in contact with another object serving as an obstacle (e.g., an enemy object), for example, other than the terrain object such as a wall. It is also determined whether or not the leader character comes in contact with an object serving as the ground, for example, within the range of the predetermined distance in the height direction with reference to the footprint reference coordinates. It is noted that a movable range may be searched for by determining whether or not the leader character comes in contact with another object (e.g., an object such as a ship), for example, other than the terrain object serving as the ground.

Referring to FIG. 9(B), in this case, a wall object serving as an obstacle is arranged in the horizontal direction (lateral direction) perpendicular to the traveling direction with reference to the footprint reference coordinates. On the other hand, a cliff is provided on a side opposite the wall object.

First, it is determined whether or not the leader character comes in contact with the object serving as an obstacle within the range of the predetermined distance in the horizontal direction. Then, within a range for which it has been determined that the leader character does not come in contact with the object, a movable range in the height direction is calculated. More specifically, it is determined whether or not the leader character comes in contact with the terrain object serving as the ground in the height direction (vertical direction), within the range defined as the movable range in the horizontal direction.

In this case, it is determined that the leader character comes in contact with the object serving as the ground in a downward direction within the range defined as the movable range in the horizontal direction on the wall side, and therefore it is determined that the leader character can move in the height direction. As an example, the ability to move is indicated with outline circle symbols.

On the other hand, it is determined that the leader character comes in contact with the terrain object partially serving as the ground in the downward direction within the range defined as the movable range in the horizontal direction on the cliff side, and therefore it is thus determined that the leader character can move in the height direction. As to the cliff portion, on the other hand, there is no object serving as the ground in the downward direction, and therefore it is determined that the leader character cannot move in the height direction. As an example, the inability to move is indicated with cross symbols.

As such, the movable range can be calculated in the horizontal direction (lateral direction) perpendicular to the traveling direction and the height direction with reference to the footprint reference coordinates.

Referring to FIG. 9(C), the terrain includes steps in this case.

It is assumed, for example, that the leader character is allowed to move for a predetermined width in the height direction. In this case, it is determined whether or not the leader character comes into contact with an object serving as an obstacle within a range of a predetermined distance by varying the height in the horizontal direction (e.g., varying upward) in which the search is conducted. Then, as described above, it is determined whether or not the leader character comes in contact with an object serving as the ground in the downward direction. In this example, it is determined that the leader character comes in contact with the object serving as the ground in the downward direction within the range defined as the movable range in the horizontal direction of a varying height in this case, and therefore it is determined that the leader character can move in the height direction. As an example, the ability to move is indicated with outline circle symbols.

As such, the movable range can be calculated in the horizontal direction (lateral direction) perpendicular to the traveling direction and the height direction with reference to the footprint reference coordinates.

It is noted that a range of a movable length (line) can be set as the movable range. Alternatively, the movable range can be calculated as a region having a predetermined width in the traveling direction.

Figure 3:
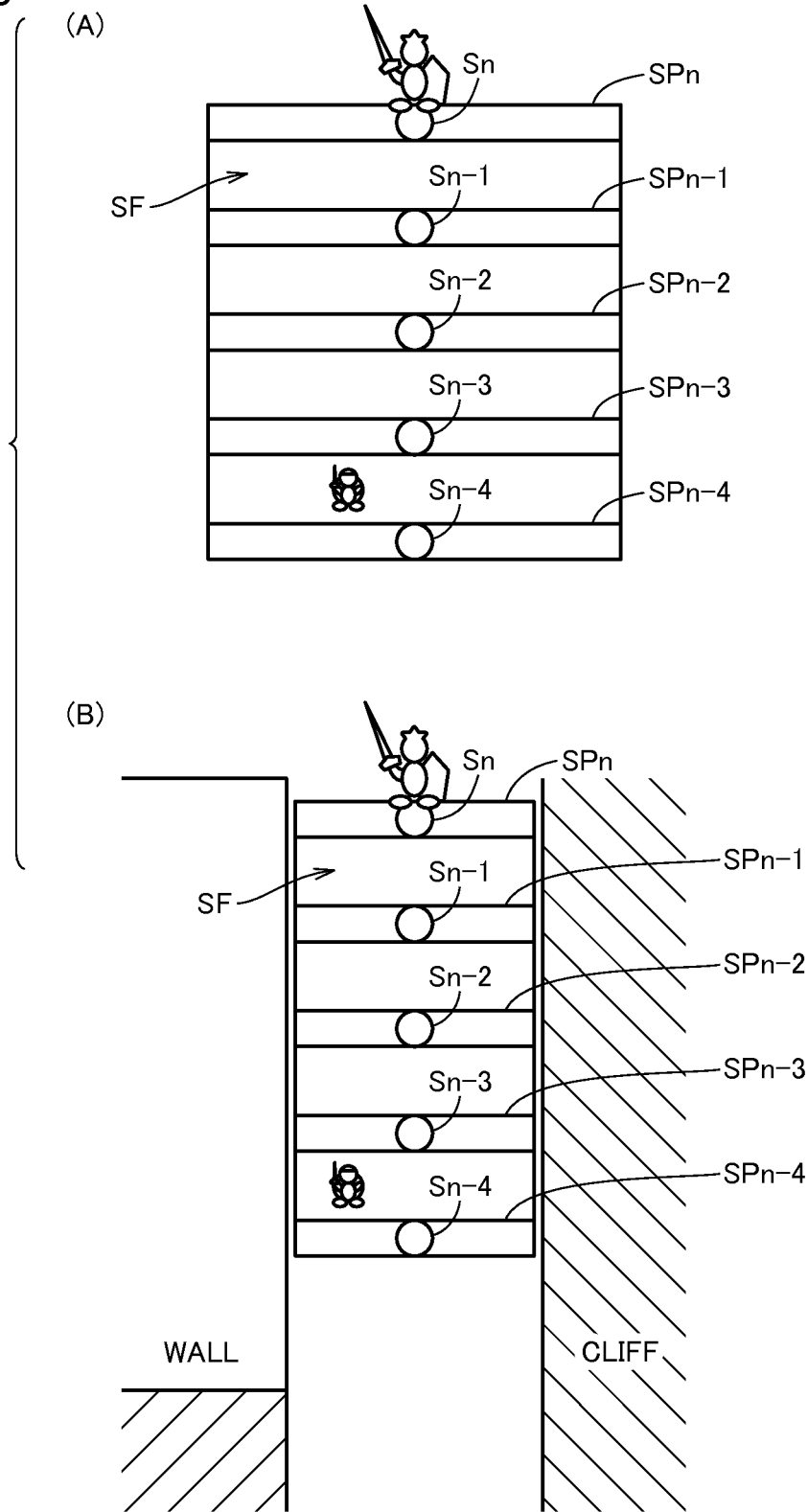
FIGS. 3(A) and 3(B) show exemplary illustrative non-limiting diagrams illustrating movement ranges of the characters according to the first exemplary embodiment.

Then, this process is repeatedly performed once every predetermined number of frames (e.g., ten frames) as described above, thereby setting the plurality of movable ranges SP described with reference to FIG. 3. Then, safe region SF is formed based on the plurality of movable ranges.

Figure 10:
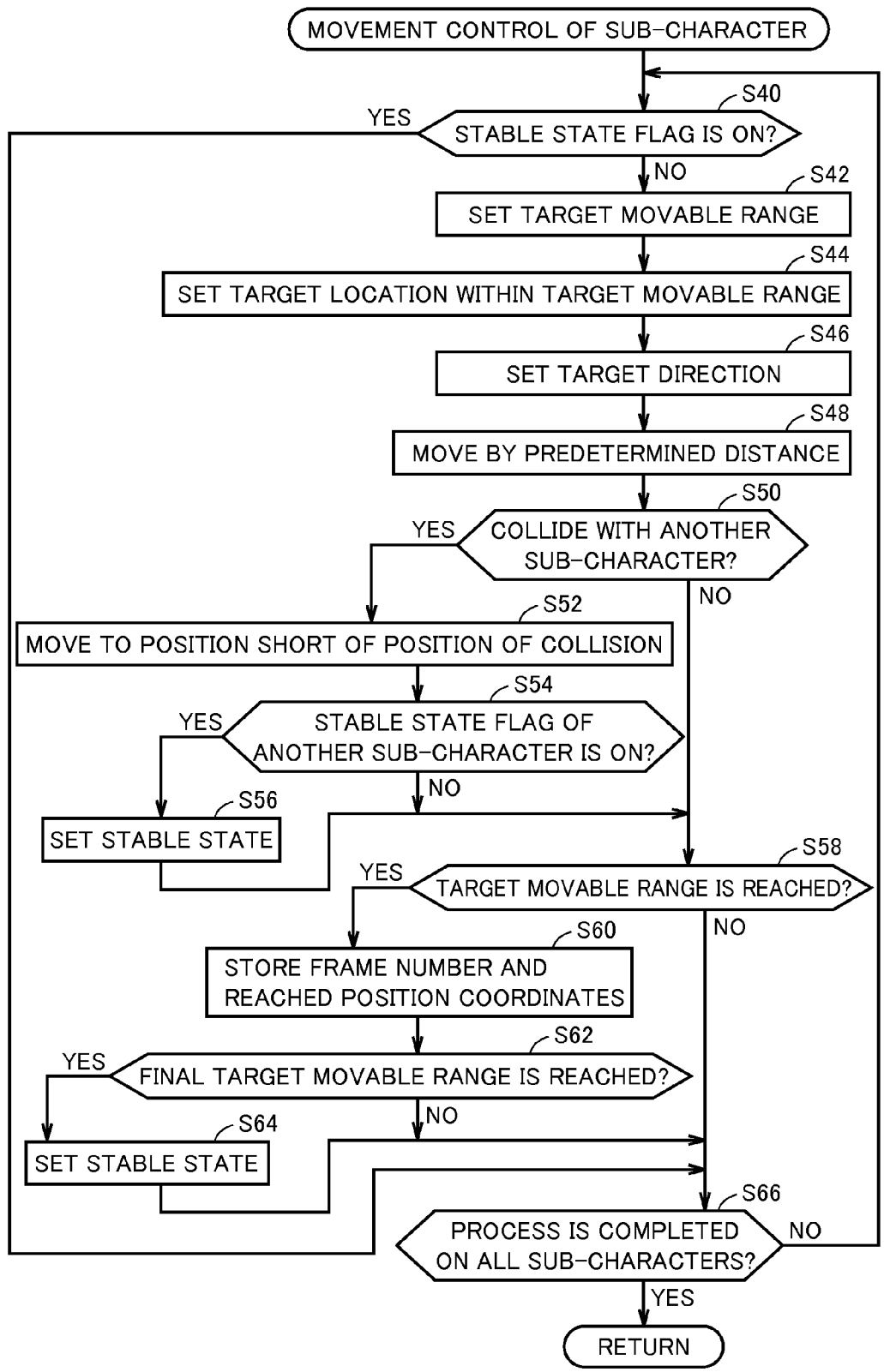
FIG. 10 shows an exemplary illustrative non-limiting flowchart illustrating the details of a movement control process of sub-characters according to the first exemplary embodiment.

FIG. 10 is a flowchart illustrating the details of the movement control process of the sub-characters according to the first embodiment.

Referring to FIG. 10, this movement control process is performed on each sub-character. For example, the process is performed in ascending order in accordance with the numbers of characters. Although this example describes performing the process in ascending order as an example, this is not particularly restrictive, and the order may be defined depending on the characteristics, attributes or the like of the characters. Alternatively, the process can be performed randomly.

First, processor 13 determines whether or not the stable state flag of the sub-character is ON (step S40).

If it is determined in step S40 that the stable state flag of the sub-character is ON (YES in step S40), processor 13 does not perform the movement control. Thus, the process proceeds straight to step S66.

In step S66, processor 13 determines whether or not the process has been completed on all sub-characters (step S66). If it is determined in step S66 that the process has been completed on all sub-characters (YES in step S66), the process ends (RETURN). If it is determined in step S66 that the process has not been completed on all sub-characters (NO in step S66), on the other hand, the process returns to step S40 and a similar process is repeated for the other sub-characters. Namely, the movement control process is performed on the sub-characters whose stable state flags are OFF.

If it is determined in step S40 that the stable state flag of the sub-character is not ON, namely, is OFF (NO in step S40), processor 13 sets a movable range serving as a movement target (also referred to as a target movable range) (step S42). Specifically, a movable range subsequent to the latest movable range that has already been reached is set as the target movable range.

Next, processor 13 sets a target location within the target movable range (step S44). This target location is for setting a target direction when the sub-character moves for a predetermined distance from the current coordinates.

Figure 11:
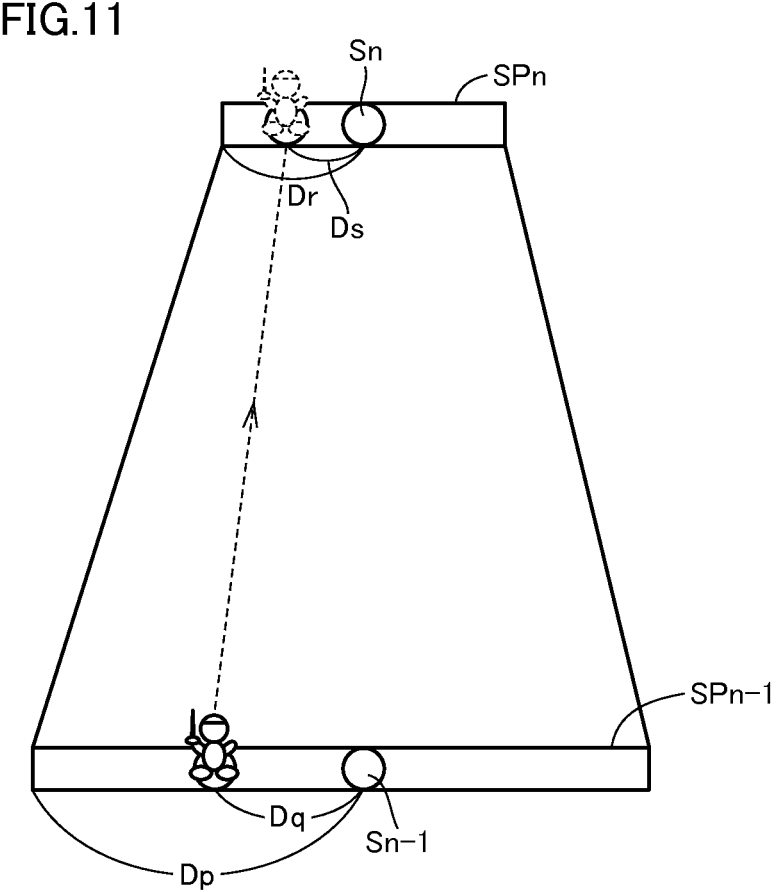
FIG. 11 shows an exemplary illustrative non-limiting diagram illustrating setting of a target location within a target movable range according to the first exemplary embodiment.

FIG. 11 illustrates the setting of the target location within the target movable range according to the first embodiment.

Referring to FIG. 11, in this example, based on a position on the movable range passed lastly by the sub-character, the target is set on a position on the next movable range. More specifically, the target location within the target movable range is set based on a position passed lastly by the sub-character from footprint reference coordinates in the movable range.

As an example, a case where the sub-character is positioned within movable range SPn−1 is described. In this case, movable range SPn is set as the target movable range.

In this example, movable range SPn−1 has a length Dp between footprint reference coordinates Sn−1 and the end of the region range in a horizontal direction, and a length Dq between footprint reference coordinates Sn−1 and the sub-character in the horizontal direction, as an example. Length Dp can be calculated from the region range of movable range SPn−1. Length Dq can be calculated based on position coordinates reached within the movable range corresponding to the latest frame number reached included in the sub-character data and footprint reference coordinates Sn−1. It is noted that in this example, since the sub-character is positioned within movable range SPn−1, length Dq can also be calculated based on the position coordinates of the sub-character and footprint reference coordinates Sn−1.

When a length between footprint reference coordinates Sn and the end of the region range in the horizontal direction of target movable range SPn is represented as Dr, a length Ds between footprint reference coordinates Sn and the target location is calculated as Dq×Dr/Dp. It is noted that length Dr can be calculated from the region range of movable range SPn.

That is, the target location within the target movable range is set depending on the position of the sub-character relative to the length between the footprint reference coordinates and the end of the region range in the horizontal direction in the movable range where the sub-character is positioned. With this method, a target location shifted by length Ds in the horizontal direction from the footprint reference coordinates in the target movable range can be set.

By setting the target location within the movable range as in this example, a movement path of the sub-character can be included in safe region SF.

Although this example described the method of setting the target location within the target movable range depending on the position of the sub-character relative to the length between the footprint reference coordinates and the end of the region range in the horizontal direction with reference to the footprint reference coordinates, this method is not particularly restrictive. For example, the target location within the target movable range may be set depending on the position of the sub-character with reference to the end of the region range, or the target location may be set anywhere within the target movable range. Furthermore, although this example described setting the target location within the target movable range, the target location can be set anywhere in safe region SF.

Referring again to FIG. 10, next, processor 13 sets a target direction (step S46). Specifically, the target direction is set based on the coordinates of the target location and the current coordinates of the sub-character.

Next, processor 13 moves the sub-character by a predetermined distance (step S48). Specifically, the current coordinates of the sub-character are shifted in the thus set target direction by an amount corresponding to the amount of movement speed of the sub-character. It is noted that, in doing so, the sub-character may be moved until it reaches the set target location, or may be moved from the current coordinates in the target direction by a predetermined distance past the set target location.

Next, processor 13 determines whether or not the sub-character will collide with another sub-character if the sub-character moves (step S50). The another sub-character as used herein refers to a sub-character which is among a plurality of sub-characters provided to follow the leader character, and which is different from the sub-character selected as an object of the movement control. It is noted that this another sub-character may be a sub-character that has been subjected to the movement control, or a sub-character that has not been subjected to the movement control, among all the sub-characters.

If it is determined in step S50 that the sub-character will collide with another sub-character (YES in step S50), processor 13 moves the sub-character to a position short of the position of collision (step S52).

Next, processor 13 determines whether or not the stable state flag of the another sub-character is ON (step S54). In this example, as described above, if the sub-character collides with another sub-character whose stable state flag is ON, the stable state flag of this colliding sub-character is turned ON, to end the movement control of this sub-character. Therefore, it is determined whether or not the stable state flag of the another sub-character is ON.

If it is determined in step S54 that the stable state flag of the another sub-character is ON (YES in step S54), processor 13 turns the stable state flag of the sub-character ON (step S56). Specifically, the stable state flag of the sub-character in sub-character data 76 is changed from OFF to ON. This causes the sub-character selected as an object of the movement control to stop moving. The process then proceeds to step S58.

If it is determined in step S54 that the stable state flag of the another sub-character is not ON (NO in step S54), on the other hand, the process skips step S56 and proceeds to step S58.

If it is determined in step S50 that the sub-character does not collide with another sub-character (NO in step S50), processor 13 determines whether or not the sub-character has reached the target movable range (step S58). It is noted that the sub-character reaching the target movable range includes a case where the sub-character has moved to the target location within the target movable range, as well as a case where the sub-character has moved further past the target location within the target movable range.

If it is determined in step S58 that the sub-character has reached the target movable range (YES in step S58), processor 13 stores a frame number and position coordinates reached within the target movable range (step S60). Specifically, the latest frame number of the already reached movable ranges included in corresponding sub-character data 76 and the reached position coordinates are updated. This information is used to set the target location described above.

Next, processor 13 determines whether or not the sub-character has reached a final target movable range (step S62). Specifically, the determination can be made based on whether or not the sub-character has reached the latest movable range stored in movable range data region 78. It is noted that the final target movable range is not limited to be the latest movable range where the leader character is currently positioned, but may be set as a movable range immediately prior to the latest one, and the like. As such, the leader character and the group of sub-characters can be separated to facilitate the movement control of the leader character.

If it is determined in step S62 that the sub-character has reached the final target movable range (YES in step S62), processor 13 turns the stable state flag of the sub-character ON (step S64). The process then proceeds to step S66.

If it is determined in step S62 that the sub-character has not reached the final target movable range (NO in step S62), on the other hand, the process skips step S64 and proceeds to step S66.

If it is determined in step S58 that the sub-character has not reached the target movable range (NO in step S58), the process proceeds to step S66.

Next, processor 13 determines whether or not the process has been completed on all sub-characters (step S66).

If it is determined in step S66 that the process has been completed on all sub-characters (YES in step S66), the process ends (RETURN).

If it is determined in step S66 that the process has not been completed on all sub-characters (NO in step S66), on the other hand, the process returns to step S40 and a similar process is repeated for the other sub-characters.

In the movement control process of the sub-characters according to the first embodiment, the target location is set within the target movable range and the target direction is set, to move the sub-characters in accordance with the movement of the leader character.

In other words, the movement control of the sub-characters is performed by setting the movement target location within safe region SF generated based on the plurality of movable ranges SP and determining the target direction. Thus, the sub-characters can be moved safely without colliding with an obstacle such as a wall or falling from a cliff.

Moreover, since the sub-character is subjected to the movement control within safe region SF generated based on the movable ranges that have been searched for in advance, there is no possibility of the sub-character being blocked by the obstacle and unable to move. Namely, the obstacle can be avoided before the obstacle blocks the sub-character, thereby implementing movement control more natural than movement control in which the obstacle is avoided after the obstacle blocks the sub-character.

In addition, the movable range in the first embodiment is set by a search around the position of the leader character with reference to the position of the leader character, and does not need to be searched for each sub-character, thereby performing movement control of the sub-character with a light processing load.

Second Embodiment

The first embodiment described moving the sub-characters to follow the leader character by setting the target movable ranges in the order of accumulation. A second embodiment describes a method of causing the sub-characters to reach the final target movable range as soon as possible. Specifically, a target movable range serving as the next movement target is changed to a movable range close to a reached movable range.

Figure 12:
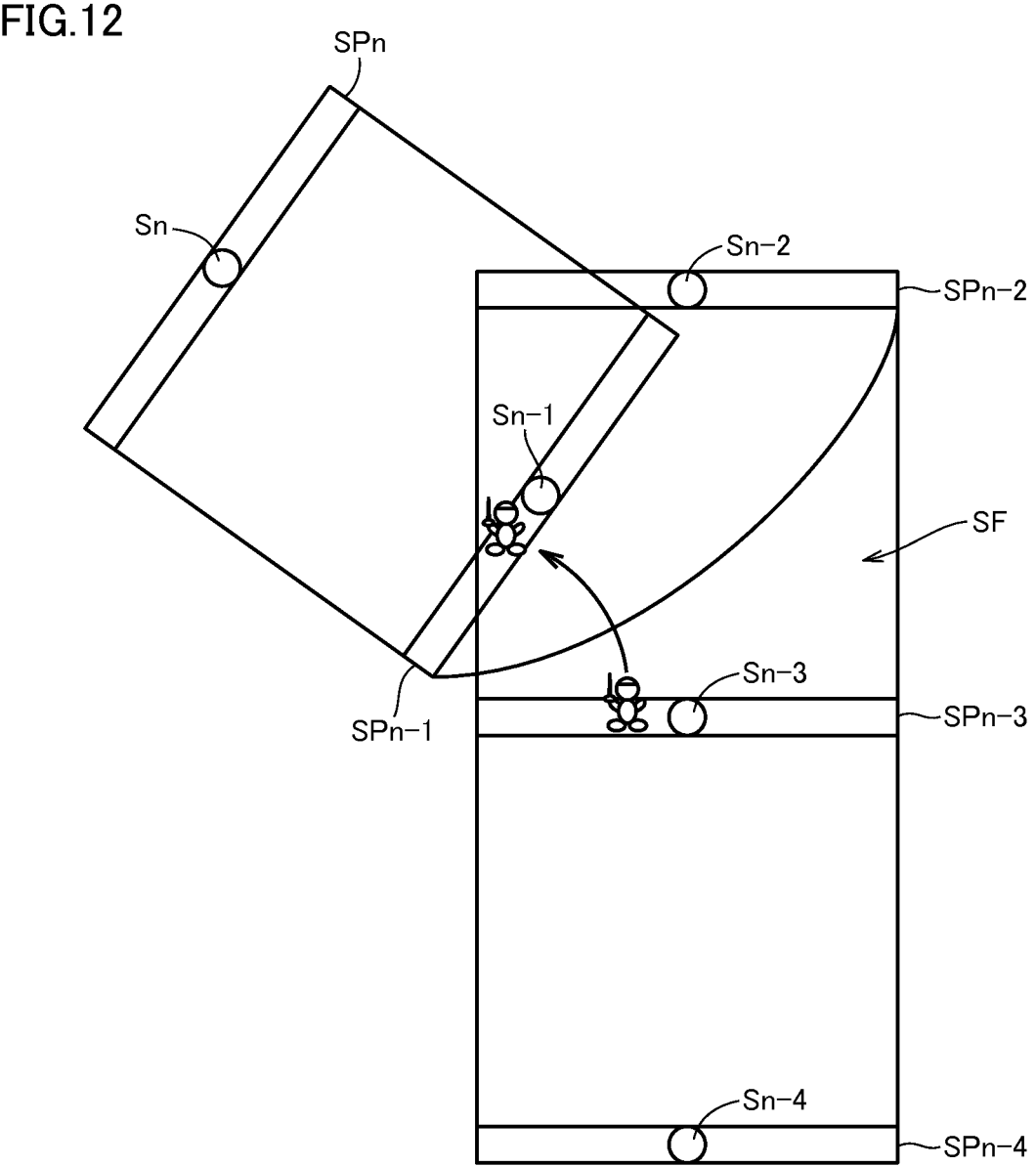
FIG. 12 shows an exemplary illustrative non-limiting diagram illustrating a change in target movable range according to a second exemplary embodiment.

FIG. 12 illustrates the change in target movable range according to the second embodiment.

Referring to FIG. 12, when a sub-character reaches movable range SPn−3, movable range SPn−2 is not set in turn as the next movement target, but a movable range closer and newer than movable range SPn−2, namely, movable range SPn−1, is set as the next movement target. Such a shortcut allows the sub-character to reach the final target movable range more quickly than when the target movable range is set in the order of accumulation.

Figure 13:
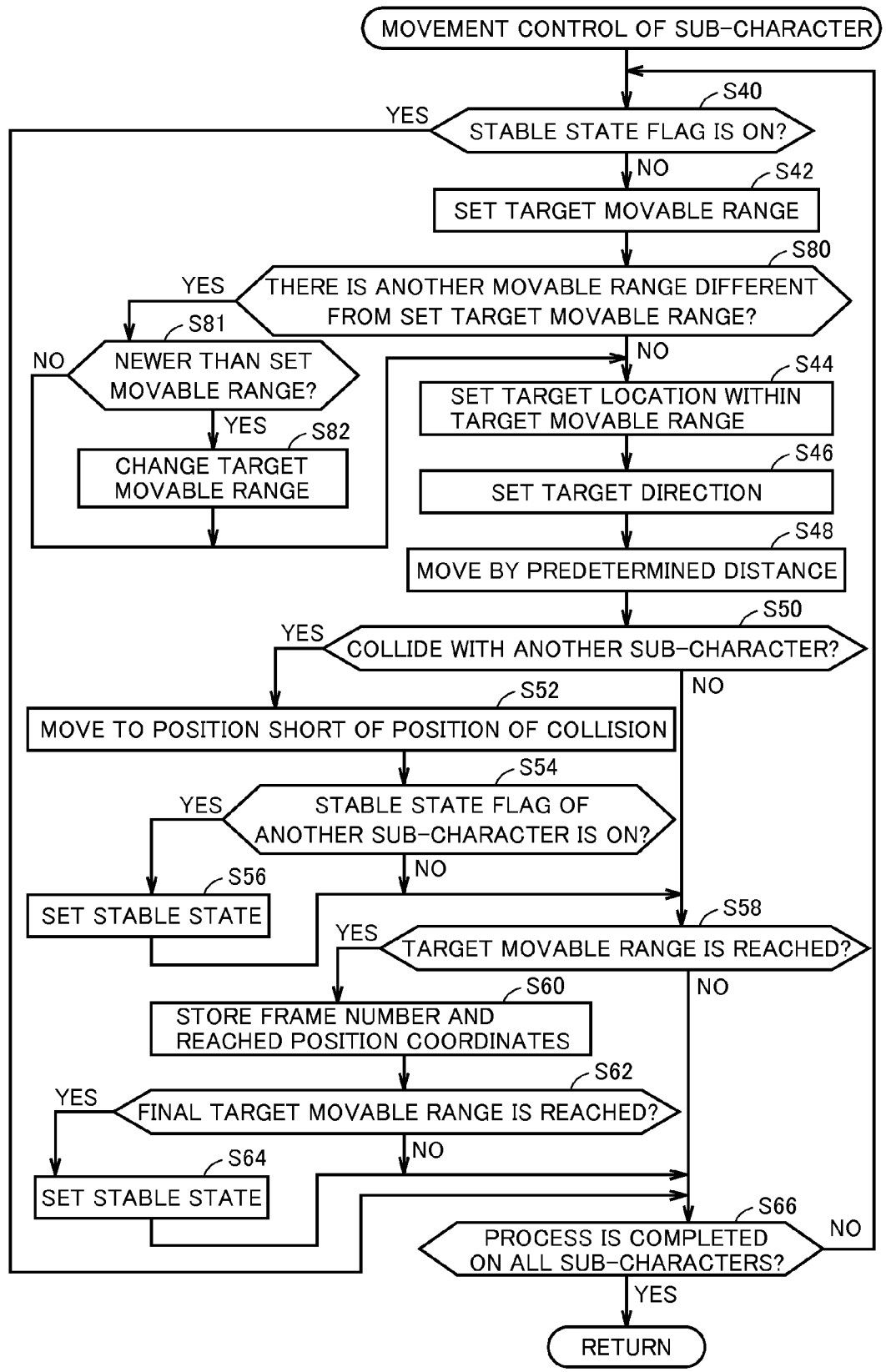
FIG. 13 shows an exemplary illustrative non-limiting flowchart illustrating the details of a movement control process of sub-characters according to the second exemplary embodiment.

FIG. 13 is a flowchart illustrating the details of the movement control process of the sub-characters according to the second embodiment.

Referring to FIG. 13, this process is different from the movement control process of the sub-characters shown in FIG. 10 in that processing between steps S80 to S82 is added. The process is otherwise similar and thus detailed description thereof will not be repeated.

After the target movable range is set in step S42, processor 13 determines whether or not there is another movable range different from the set target movable range (step S80). Specifically, it is determined whether or not a movable range different from the target movable range is at least partially included in safe region SF formed by the set target movable range and a movable range reached by the sub-character. It is determined whether or not there is a movable range having a region range at least partially overlapping this safe region SF.

If it is determined in step S80 that there is another movable range different from the set target movable range (YES in step S80), processor 13 determines whether or not this another movable range is newer than the set movable range (step S81). Namely, it is determined whether or not there is a movable range closer and newer than the movable range serving as the next movement target.

If it is determined in step S81 that this another movable range is newer than the set movable range (YES in step S81), processor 13 changes the target movable range (step S82). Specifically, the target movable range is changed to this another movable range. It is noted that if there are a plurality of movable ranges different from the set target movable range, this process is repeated a plurality of times.

Next, processor 13 sets a target location within this changed target movable range (step S44).

If it is determined in step S81 that the another movable range is not newer than, namely, is older than, the set movable range (NO in step S81), on the other hand, the process skips step S82 and proceeds to step S44. It is noted that if there are a plurality of movable ranges different from the set target movable range, this process is repeated a plurality of times.

If it is determined in step S80 that there is no other movable range different from the set target movable range (NO in step S80), the process proceeds to step S44.

The subsequent process is similar to that described with reference to FIG. 10 and thus detailed description thereof will not be repeated.

In the example described with reference to FIG. 12, when a sub-character reaches movable range SPn−3, movable range SPn−2 is set in turn as the next movement target. Then, it is determined that movable range SPn−1 exists in safe region SF formed by target movable range SPn−2 and movable range SPn−3. Since movable range SPn−1 is newer than target movable range SPn−2, the target movable range is changed from movable range SPn−3 to movable range SPn−1. Then, a target location is set within movable range SPn−1, and the movement control of the sub-character is performed. Such a shortcut allows the sub-character to reach the final target movable range more quickly than when the target movable range is set in the order of accumulation, thereby implementing more natural movement control.

Third Embodiment

The above embodiments described moving the sub-characters in a manner similar to the leader character as an example. In game processing, however, the leader character and the sub-characters may have movement characteristics different from each other and movable ranges different from each other.

Figure 14:
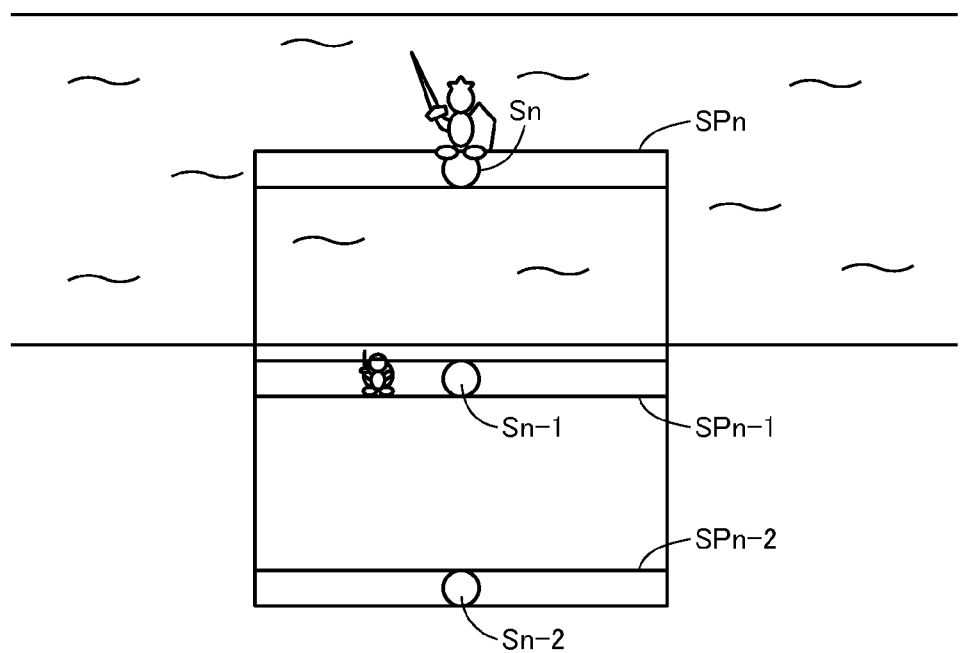
FIG. 14 shows an exemplary illustrative non-limiting conceptual diagram illustrating movement of a leader character and a sub-character according to a third exemplary embodiment.

FIG. 14 is a conceptual diagram illustrating movement of the leader character and the sub-character according to a third embodiment.

Referring to FIG. 14, this example shows a case where the leader character is moving in a region of a terrain object having water as attribute information.

On the other hand, the sub-character is in a position short of a position of entering the water in this case. This example describes a case where the leader character can move in a region of a terrain object having water as an attribute, whereas the sub-character cannot move in a region of a terrain object having water as an attribute. Specifically, the movement characteristic of the sub-character data includes information defining a case where the sub-character cannot move through the water.

Figure 15:
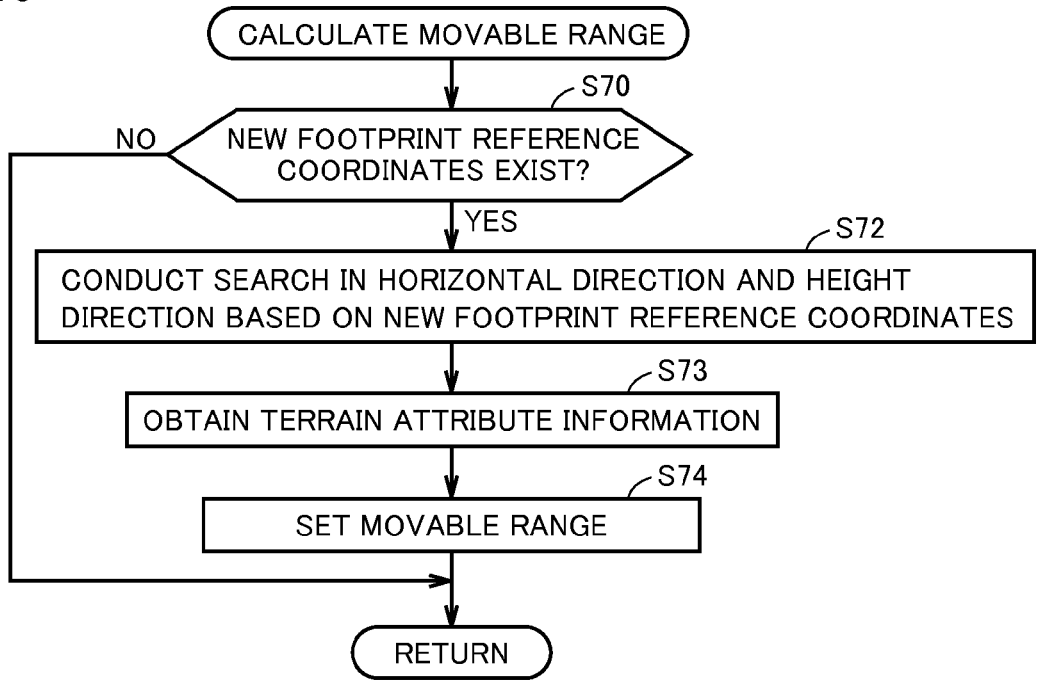
FIG. 15 shows an exemplary illustrative non-limiting flowchart illustrating the details of a movable range calculation process according to the third exemplary embodiment.

FIG. 15 is a flowchart illustrating the details of a movable range calculation process according to the third embodiment.

Referring to FIG. 15, this flow is different from the flow of the movable range calculation process shown in FIG. 8 in that step S73 is added.

Specifically, after the movable range in the horizontal direction and the height direction is searched for (step S72), processor 13 obtains terrain attribute information (step S73). Specifically, regarding the movable range that has been searched for, attribute information about a region of a terrain object is obtained based on the field information. Specifically, attribute information associated with the terrain object is obtained. In the example of FIG. 14, for example, water is obtained as attribute information on a terrain object corresponding to movable range SPn.

Next, processor 13 sets a movable range (step S74). Specifically, the movable region range that has been searched for as described above is associated with footprint reference coordinates and a frame number, and is registered as the latest movable range data including the obtained attribute information on the terrain object, in the area for storing new movable range data as described above.

Then, the process ends (RETURN).

Figure 16:
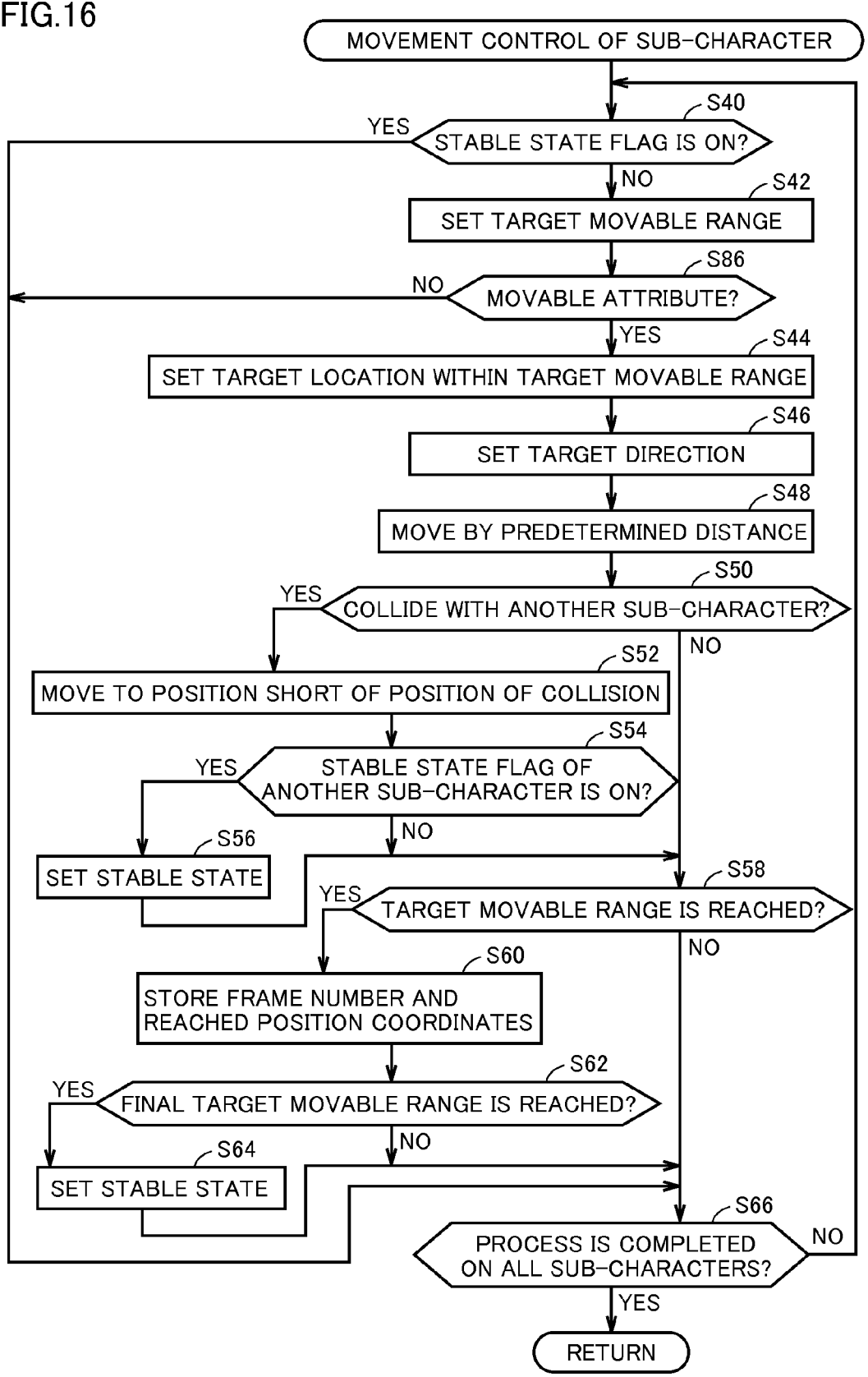
FIG. 16 shows an exemplary illustrative non-limiting flowchart illustrating the details of a movement control process of sub-characters according to the third exemplary embodiment.

FIG. 16 is a flowchart illustrating the details of the movement control process of the sub-characters according to the third embodiment.

Referring to FIG. 16, this process is different from the movement control process of the sub-characters shown in FIG. 10 in that step S86 is added. The process is otherwise similar and thus detailed description thereof will not be repeated.

After the target movable range is set in step S42, processor 13 determines whether or not the attribute is a movable attribute (step S86). Specifically, attribute information on a terrain object set in association with the target movable range is obtained, and it is determined whether or not the sub-character can move through this terrain object. In this example, it is determined whether or not the sub-character can move through the terrain object based on the characteristics of the sub-character data. For example, if the attribute information on the terrain object is water, and if the characteristics of the sub-character data include information defining a case where the sub-character cannot move through the water, it is determined that the attribute is not a movable attribute. If the sub-character can move through the water, on the other hand, it is determined that the attribute is a movable attribute.

If it is determined in step S86 that the attribute is a movable attribute (YES in step S86), a target location is set within the target movable range (step S44). The subsequent process is similar to that described with reference to FIG. 10 and thus detailed description thereof will not be repeated.

If it is determined in step S86 that the attribute is not a movable attribute (NO in step S86), on the other hand, the process proceeds to step S66. Namely, the movement process of this sub-character is not performed.

With this process, the movement control can be changed when the leader character and the sub-characters have movement characteristics different from each other.

In this example, the sub-character stops at a position short of the position of entering the region of the terrain object having water as attribute information. Alternatively, when the sub-character cannot move through the attribute in the attribute information on the terrain object set in association with the target movable range, a special movement control process of causing the sub-character to jump, for example, can be performed instead of stopping the sub-character.

With this process, when the leader character and the sub-characters have movement characteristics different from each other, natural movement control can be implemented depending on the movement characteristic of the sub-character.

Modification of Third Embodiment

As another modification where the leader character and the sub-characters have movement characteristics different from each other, the leader character may move on foot, whereas the sub-characters may move by flying in the air in the game space.

Figure 17:
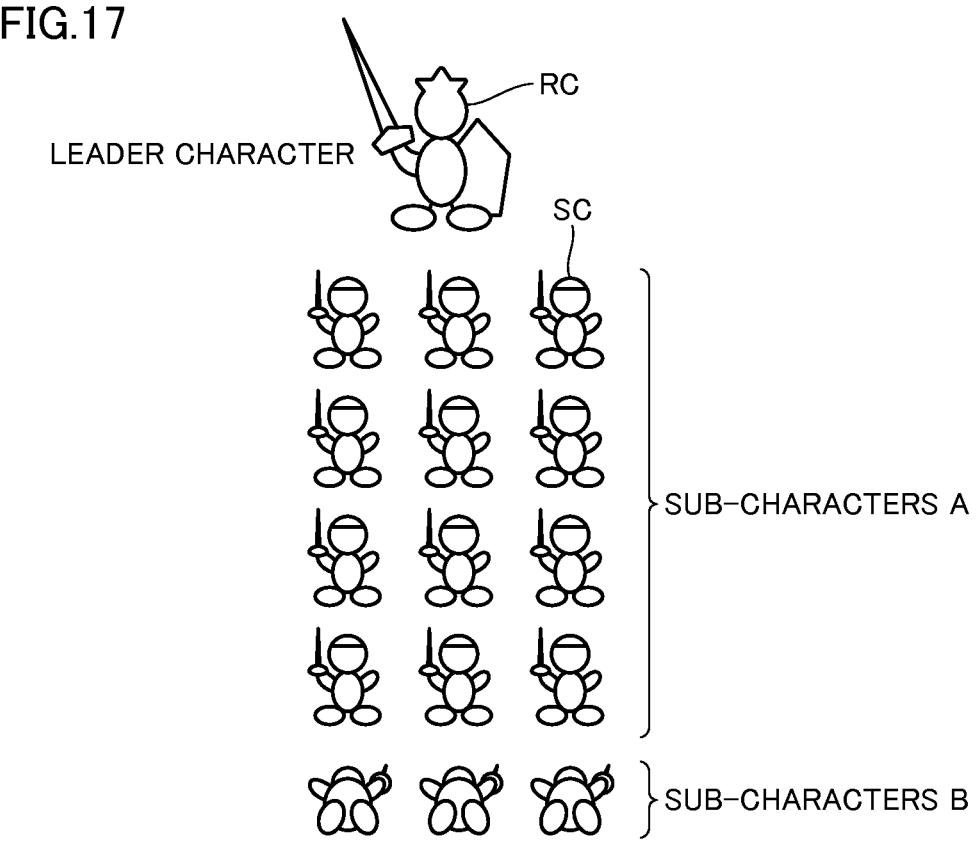
FIG. 17 shows an exemplary illustrative non-limiting diagram illustrating a case where a leader character and sub-characters have movement characteristics different from each other according to a modification of the third exemplary embodiment.

FIG. 17 illustrates a case where the leader character and the sub-characters have movement characteristics different from each other according to the modification of the third embodiment.

Referring to FIG. 17, sub-characters A and sub-characters B are shown in columns in this example as compared to the characters shown in FIG. 2.

Sub-characters A are ordinary sub-characters and move on foot just like the leader character, whereas sub-characters B are special characters and move by flying in the air unlike the leader character and sub-characters A.

That is, the movement characteristic of sub-characters B includes information defining a case where sub-characters B move in the air.

A movable range of the special sub-characters can be set to be different from that of ordinary sub-characters A. That is, a movable range is variably set based on the characteristics of the sub-characters.

Figure 18:
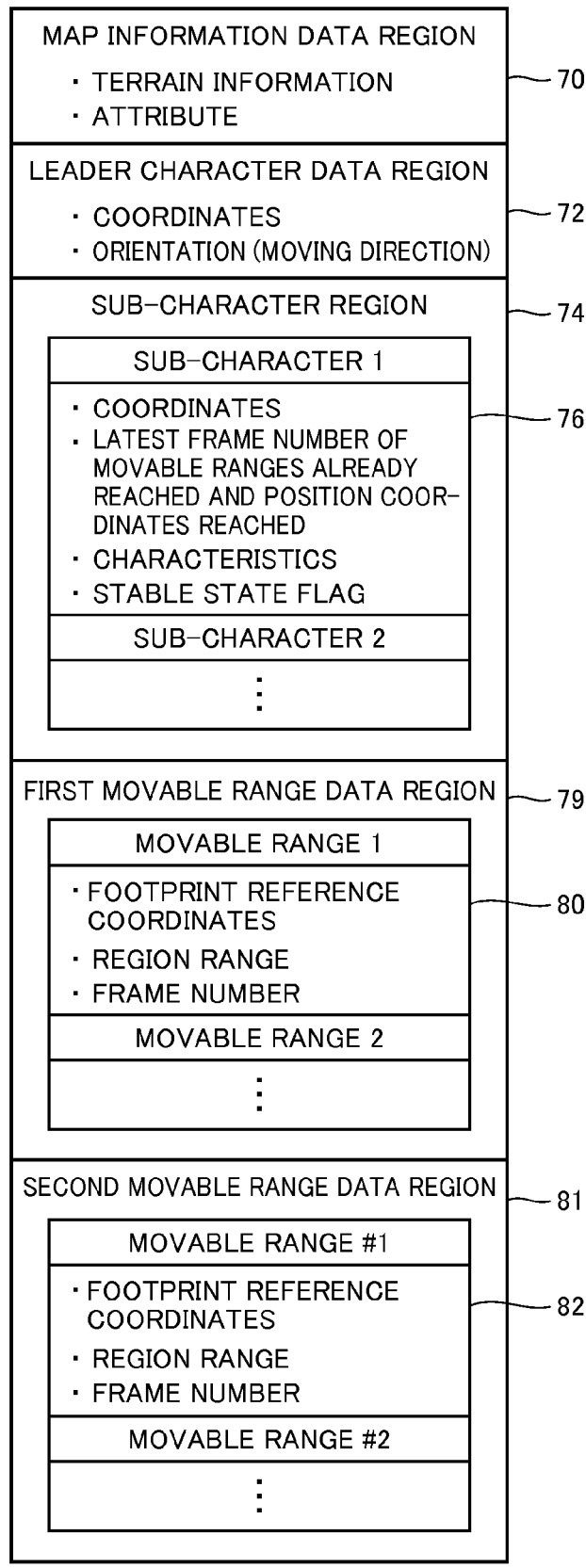
FIG. 18 shows an exemplary illustrative non-limiting diagram illustrating a memory map of main memory 15 according to the modification of the third exemplary embodiment.

FIG. 18 illustrates a memory map of main memory 15 according to the modification of the third embodiment.

Referring to FIG. 18, this memory map is different from the memory map of the main memory shown in FIG. 5 in that movable range data region 78 is replaced with a first movable range data region 79, and that a second movable range data region 81 is added.

First movable range data region 79 stores movable range data 80, which is the result of a search for a movable range of ordinary sub-characters A, as was described with reference to FIG. 5. The movable range in first movable range data region 79 is also referred to as a first movable range.

Second movable range data region 81 stores movable range data 82, which is the result of a search for a movable range of sub-characters B different from the ordinary sub-characters, in this example. The movable range in second movable range data region 81 is also referred to as a second movable range.

Each movable range data includes footprint reference coordinates, a region range, and a frame number.

Figure 19:
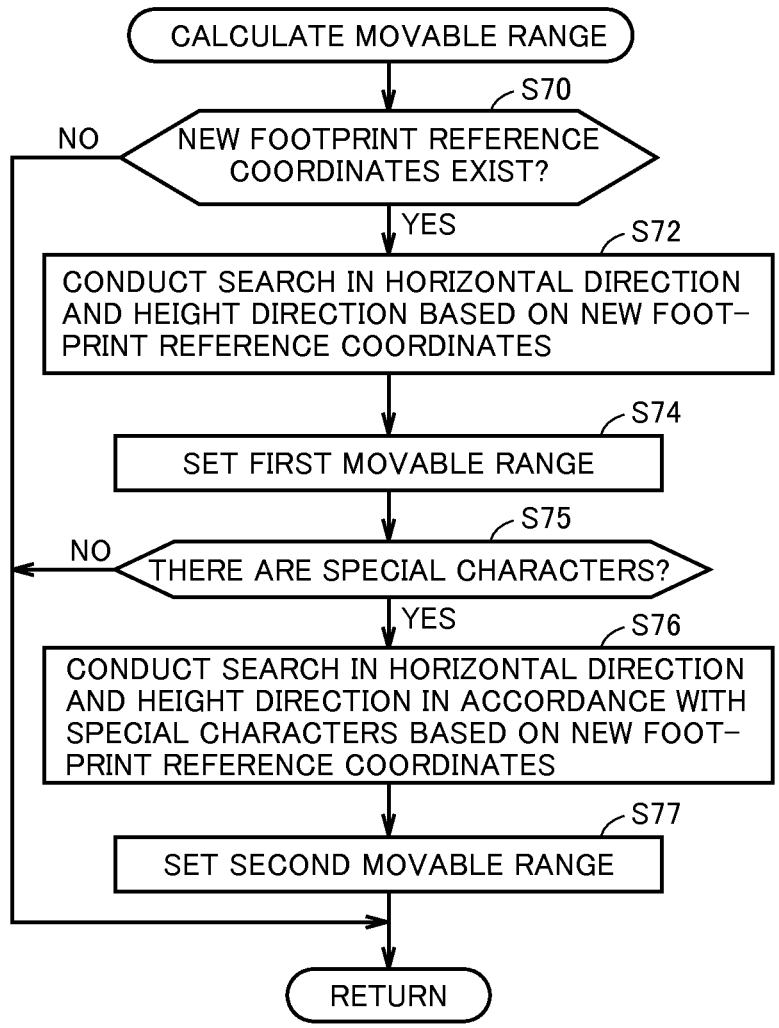
FIG. 19 shows an exemplary illustrative non-limiting flowchart illustrating the details of a movable range calculation process according to the modification of the third exemplary embodiment.

FIG. 19 is a flowchart illustrating the details of the movable range calculation process according to the modification of the third embodiment.

Referring to FIG. 19, this flow is different from the flow of the movable range calculation process shown in FIG. 8 in that processing between steps S75 to S77 is added.

Specifically, in step S74, processor 13 sets the first movable range based on the result of the search in the horizontal direction and the height direction. That is, information about the first movable range is registered in first movable range data region 79. The first movable range corresponds to a range where sub-characters A can move.

Next, processor 13 determines whether or not there are any special sub-characters (step S75). In this example, sub-characters B correspond to the special sub-characters.

Figure 9:
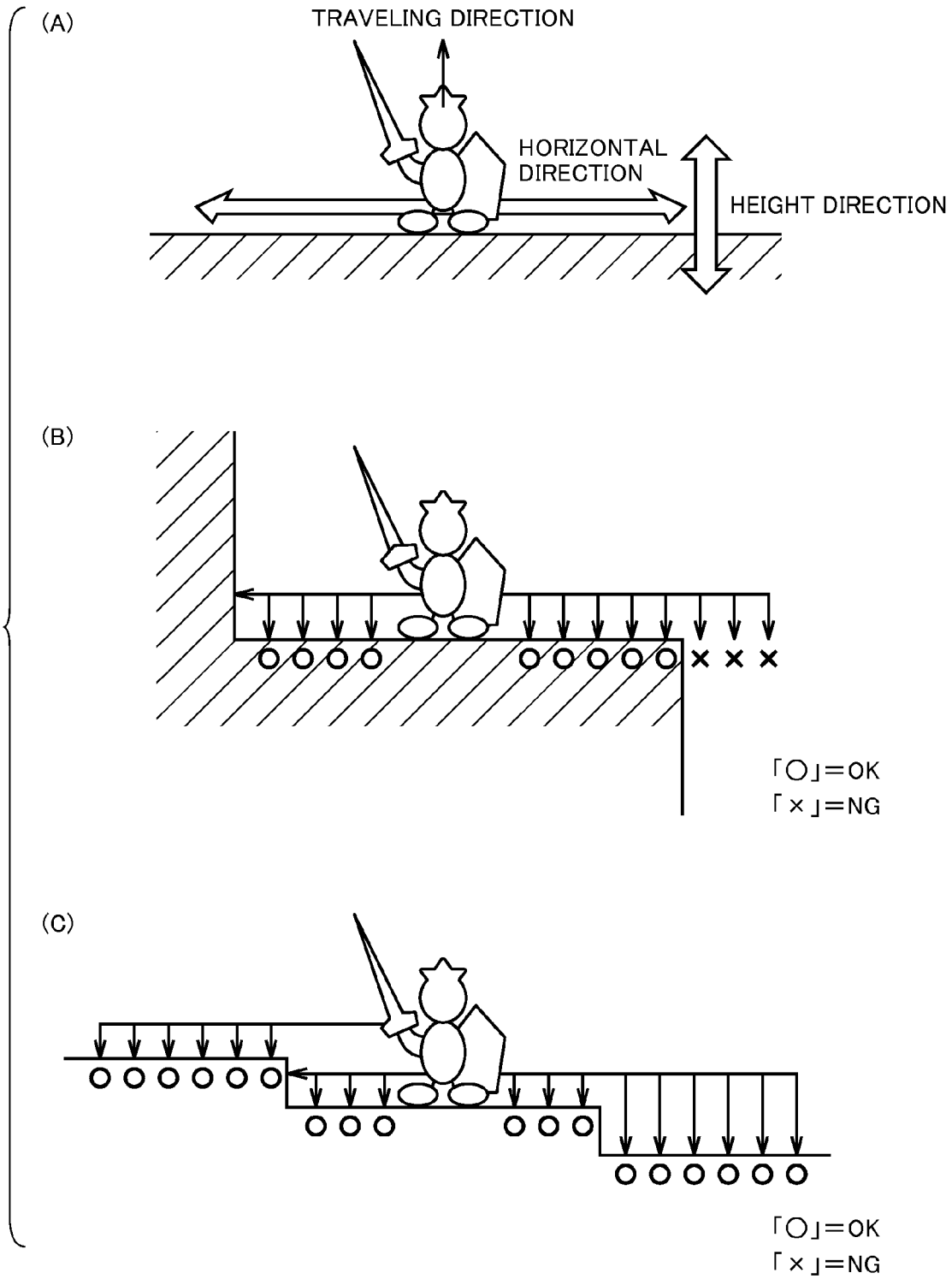
FIGS. 9(A) to 9(C) show exemplary illustrative non-limiting diagrams illustrating the concept of searching for a movable range according to the first exemplary embodiment.

If it is determined in step S75 that there are special sub-characters (YES in step S75), a movable range in the horizontal direction and the height direction in accordance with the special sub-characters is searched for based on new footprint reference coordinates (step S76). Specifically, a search process similar to that described with reference to FIG. 9 is performed. If the special sub-characters are sub-characters B, for example, the search may be conducted not in the height direction but only in the horizontal direction. In the case of FIG. 9(B), for example, since there is no object serving as the ground in the downward direction in the cliff portion, it is determined that ordinary sub-characters A cannot move in the height direction.

On the other hand, special sub-characters B have a movement characteristic of flying in the air, and therefore a search is conducted not in the height direction but only in the horizontal direction as an example.

In this case, the cliff portion can also be a movable range, namely, can be indicated with outline circle symbols. Alternatively, the search can be conducted not in the downward direction but in an upward direction as the height direction to determine whether or not sub-characters B collide with an obstacle and the like.

Next, processor 13 sets the second movable range based on the result of the search in the horizontal direction and the height direction (step S77). That is, information about the second movable range is registered in second movable range data region 81. The second movable range corresponds to a range where sub-characters B can move.

Then, the process ends (RETURN).

If it is determined that there are no special sub-characters (NO in step S75), on the other hand, the process ends (RETURN). This is because, in this case, there are no special sub-characters and thus there is no need to calculate the movable range of the sub-characters again.

The movement control process of the sub-characters is similar to that described with reference to FIG. 10. Specifically, for sub-characters A, movement control similar to above is performed by setting the first movable range stored in first movable range data region 79 as a target movable range, and setting a target location within this target movable range. For the special sub-characters, namely, sub-characters B, movement control similar to above is performed by setting the second movable range stored in second movable range data region 81 as a target movable range, and setting a target location within this target movable range.

With this process, the movable range of the special sub-characters can be set to be different from that for the ordinary sub-characters to perform the movement control process of the sub-characters based on this range, thereby implementing natural movement control depending on the type of sub-characters, namely, in accordance with the movement characteristic of the sub-characters.

Although this example described the sub-characters that move by flying in the air as an example of a different movement characteristic, this movement characteristic is not particularly restrictive. The present disclosure is likewise applicable to sub-characters having other characteristics. For example, if the leader character cannot move in a predetermined region (e.g., places with a swamp or fire) but sub-characters have a characteristic of being able to move in that region, a movable range of the sub-characters can be calculated by a process similar to above to perform movement control.

Other Embodiments

Although the above embodiments described the methods of performing movement control of the sub-characters by setting the target location within the target movable range, the movement control of the sub-characters can be performed by setting movement target coordinates based on coordinates of the leader character.

Figure 20:
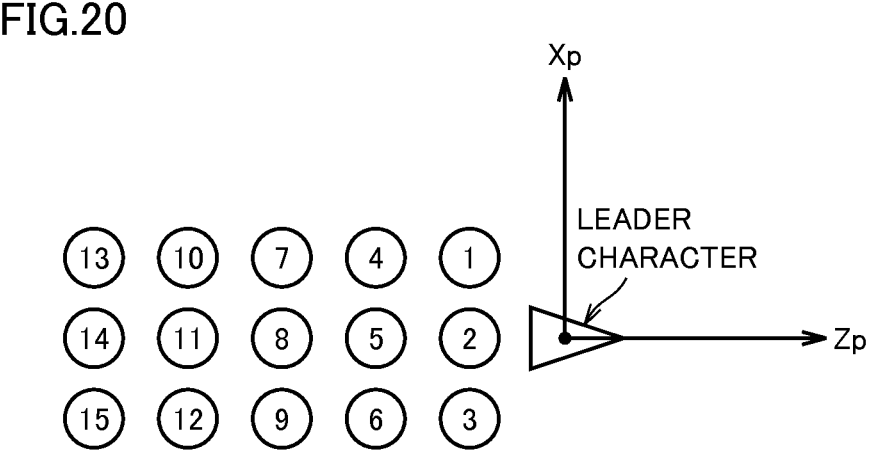
FIG. 20 shows an exemplary illustrative non-limiting diagram illustrating another method of setting movement target coordinates of sub-characters.

FIG. 20 illustrates another method of setting movement target coordinates of the sub-characters.

Referring to FIG. 20, a case is shown where fifteen slots are provided relative to the position of the leader character. The number of slots is increased or decreased depending on the number of sub-characters.

The positions of the slots are defined relative to the position coordinates of the leader character. The number of each slot corresponds to the number of each sub-character, for example. For example, a sub-character No. 1 corresponds to a slot 1. A sub-character No. 2 corresponds to a slot 2. The sub-characters correspond to the slots in a similar manner.

In setting a target location, the slots are arranged in accordance with footprint reference coordinates of a target movable range, and a corresponding one of the slots arranged is set as the target location. Then, the sub-characters may be subjected to movement control toward the set target location. The process is otherwise similar.

Although the game space is set as three-dimensional virtual space in this embodiment, the present application is not limited as such, and the game space may be two-dimensional.

Although this embodiment described storing the game program in internal storage device 14, the game program may be supplied to internal storage device 14 from any storage medium, or may be supplied to internal storage device 14 via wireless communication device 16 or a wired communication line. Furthermore, the function of the game program may be implemented by hardware alone.

Although this example described the elements of the game device as being integrated with each other, the integration is not particularly restrictive, and a portion of the device may be separately provided. For example, the game device can naturally be implemented as an information processing system having a separately provided display device.

In addition, an application executable on a personal computer may be provided as the program in this embodiment. In this case, the program according to this embodiment may be incorporated as a function of various applications executed on the personal computer. While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer-readable information processing program for performing information processing for displaying and controlling the movement of virtual objects in a computer generated virtual space in which a first virtual object moves in response to an input from an input device and at least one second virtual object moves in accordance with the movement of said first virtual object in the virtual space, said information processing program being executable by a computer of an information processing apparatus and causing said computer to provide functionality and operations including:
generating a virtual space having a plurality of virtual objects;
accepting an input from a user operated input device;
performing movement control to move said first virtual object in said virtual space based on said input from the input device;
calculating and setting a plurality of movable ranges wherein said at least one second virtual object is enabled to move in said virtual space within a range of a predetermined distance in a horizontal direction perpendicular to a moving direction of the first virtual object, said movable ranges based on a position of said first virtual object;
setting a safe region by connecting the plurality of movable ranges together;
performing movement control of said at least one second virtual object based on the set safe region; and
displaying an image of the movements of said first virtual object and said at least one second virtual object on a display device.

2. The non-transitory storage medium encoded with a computer-readable information processing program according to claim 1, wherein
said movable range is repeatedly calculated.

3. The non-transitory storage medium encoded with a computer-readable information processing program according to claim 2, wherein
a region formed based upon repeatedly calculated movable ranges is set as a new movable range.

4. The non-transitory storage medium encoded with a computer-readable information processing program according to claim 2, wherein
movement control of said second virtual object is performed, by setting a newly calculated movable range as a movement target.

5. The non-transitory storage medium encoded with a computer-readable information processing program according to claim 4, wherein
movement control of said second virtual object is performed by setting a subsequent movable range in chronological order among newly calculated movable ranges as a movement target.

6. The non-transitory storage medium encoded with a computer-readable information processing program according to claim 4, wherein
movement control of said second virtual object is performed by setting a movable range closer than a subsequent movable range in chronological order among newly calculated movable ranges as a movement target.

7. The non-transitory storage medium encoded with a computer-readable information processing program according to claim 5, wherein
movement control of said second virtual object is performed by setting the movement target on a position on said subsequent movable range based on a position on the movable range passed lastly by said second virtual object.

8. The non-transitory storage medium encoded with a computer-readable information processing program according to claim 7, wherein
movement control of said second virtual object is performed by setting the movement target on the position on said subsequent movable range based on the position on the movable range passed lastly by said second virtual object with reference to a predetermined position, and the predetermined position on said subsequent movable range.

9. The non-transitory storage medium encoded with a computer-readable information processing program according to claim 1, wherein
said movable range is a range based on a direction of movement of said first virtual object.

10. The non-transitory storage medium encoded with a computer-readable information processing program according to claim 1, wherein
movement control of said second virtual object is performed by setting said movable range as a movement target.

11. The non-transitory storage medium encoded with a computer-readable information processing program according to claim 1, wherein
movement control of said second object, is performed by setting movement target coordinates based on a position of said first virtual object.

12. The non-transitory storage medium encoded with a computer-readable information processing program according to claim 1, wherein
said movable range is a range including a position of said first virtual object.

13. The non-transitory storage medium encoded with a computer-readable information processing program according to claim 1, wherein
movement control of said second object is performed within a safe region formed based on a plurality of calculated movable ranges.

14. The non-transitory storage medium encoded with a computer-readable information processing program according to claim 1, wherein
said movable range is variable in size based on a calculated range where said second virtual object can move in said virtual space.

15. The non-transitory storage medium encoded with a computer-readable information processing program according to claim 1, further comprising region information for defining a region where said at least one second virtual object is enabled to move and a region where said at least one second virtual object is not enabled to move in said virtual space, wherein
said movable range of said second object is calculated by referring to said region information.

16. The non-transitory storage medium encoded with a computer-readable information processing program according to claim 15, wherein
said region information is defined in accordance with a position and a height in said virtual space, and
said movable range of said second virtual object based is calculated on a position and a height of said first object in said virtual space by referring to said region information.

17. The non-transitory storage medium encoded with a computer-readable information processing program according to claim 1, wherein
an attribute of a region is set in said virtual space, and
movement control of said second virtual object is performed based on said attribute of said region.

18. The non-transitory storage medium encoded with a computer-readable information processing program according to claim 1, wherein
said second virtual object is provided with a movement attribute about a manner in which said second object virtual moves, and
said movable range is calculated based on the position of said first virtual object after being moved and said movement attribute.

19. A method of controlling an information processing apparatus performing information processing for displaying and controlling the movement of virtual objects in a computer generated virtual space in which a first virtual object moves and at least one second virtual object moves in accordance with the movement of said first virtual object in the virtual space, said method comprising:
generating a virtual space having a plurality of virtual objects;
accepting an input from a user operated input device;
performing movement control to move said first virtual object in said virtual space based on said input;
calculating and setting a plurality of movable ranges wherein said at least one second virtual object is enabled to move in said virtual within a range of a predetermined distance in a horizontal direction perpendicular to a moving direction of the first virtual object, said movable ranges based on a position of said first virtual object;
setting a safe region by connecting the plurality of movable ranges together;
performing movement control of said at least one second virtual object based on the set safe region; and
displaying an image of the movements of said first virtual object and said at least one second virtual object on a display device.

20. An information processing apparatus performing information processing for displaying and controlling the movement of virtual objects in a computer generated virtual space in which a first virtual object moves and at least one second virtual object moves in accordance with the movement of said first virtual object in the virtual space, said information processing apparatus including at least a computer processor, a display device and an input device, the computer processor configured to:
generate a virtual space having a plurality of virtual objects;
accept an input from said input device;
perform movement control of said first object in said virtual space based on said input from the input device;
calculate and set a plurality of movable ranges wherein said at least one second virtual object is enabled to move in said virtual space within a range of a predetermined distance in a horizontal direction perpendicular to a moving direction of the first virtual object, said movable ranges based on a position of said first virtual object;
setting a safe region by connecting the plurality of movable ranges together;
perform movement control of said at least one second virtual object based on the set safe region; and
display an image of the movements of said first virtual object and at said least one second virtual object in said virtual space on a display device.

21. An information processing system including an information processing apparatus performing information processing for displaying and controlling the movement of virtual objects in a computer generated virtual space in which a first virtual object moves and at least one second virtual object moves in accordance with the movement of said first virtual object in the virtual space, said information processing system including at least a computer processor, a display device and an input device, the computer processor configured to:
generate a virtual space having a plurality of virtual objects;
accept an input from said input device;
perform movement control of said first virtual object in said virtual space based on the input from said input device;
calculate and set a plurality of movable ranges wherein said at least one second object is enabled to move in said virtual space within a range of a predetermined distance in a horizontal direction perpendicular to a moving direction of the first virtual object, said movable ranges based on a position of said first virtual object;
setting a safe region by connecting the plurality of movable ranges together;
perform movement control of said at least one second virtual object based on the set safe region; and
display an image of the movements of said first virtual object and said at least one second virtual object on a display device.

* * * * *